United States Patent
Fujioka

(10) Patent No.: US 6,725,375 B2
(45) Date of Patent: Apr. 20, 2004

(54) MICROCOMPUTER AND METHOD AND APPARATUS FOR CHANGING THE CONTENTS OF THE MEMORY IN THE MICROCOMPUTER

(75) Inventor: Shuzo Fujioka, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 405 days.

(21) Appl. No.: 09/729,801

(22) Filed: Dec. 6, 2000

(65) Prior Publication Data

US 2002/0013884 A1 Jan. 31, 2002

(30) Foreign Application Priority Data

Jul. 11, 2000 (JP) .......................... 2000-210142

(51) Int. Cl.[7] .............................. G06F 9/06; G06F 1/00; H04L 9/12
(52) U.S. Cl. ........................................ 713/191; 713/200
(58) Field of Search ................................ 711/163; 713/2, 713/100, 150, 191, 200

(56) References Cited

U.S. PATENT DOCUMENTS 5,964,873 A * 10/1999 Choi ........................... 713/2
5,978,862 A * 11/1999 Kou et al. .................. 713/100
5,978,912 A * 11/1999 Rakavy et al. ............. 713/2
6,003,134 A * 12/1999 Kuo et al. .................. 713/200

FOREIGN PATENT DOCUMENTS

JP 9-35018 2/1997
JP 9-102020 4/1997

OTHER PUBLICATIONS

Microsoft Press Computer Dictionary, 2nd ed.; Microsoft Press, 1994, p. 52.*

* cited by examiner

*Primary Examiner*—David L. Robertson
(74) *Attorney, Agent, or Firm*—Burns, Doane, Swecker & Mathis, L.L.P.

(57) ABSTRACT

There is provided a microcomputer including: an external apparatus discrimination means for discriminating that an external apparatus is connected to said microcomputer via an IC card interface section, based on a discrimination signal to be transmitted by said external apparatus, when the external apparatus is placed in a communicatable status which allows communication by feeding a power supply, a clock signal and initializing an operation; and memory contents change means for receiving data including a CPU program, from the external apparatus and executing changing of the contents of a memory, thereby allowing modification of a CPU program stored in the microcomputer during manufacture.

12 Claims, 13 Drawing Sheets

MICROCOMPUTER AND METHOD AND APPARATUS FOR CHANGING THE CONTENTS OF THE MEMORY IN THE MICROCOMPUTER

BACKGROUND OF THE INVENTION

1. Field of the Invention

The present invention relates to a microcomputer having an IC card interface section connected so as to be in communication with an external apparatus comprising an IC card, and a non-volatile memory which stores data, including a CPU program to be executed by a CPU. More specifically, it relates to a microcomputer capable of changing the CPU program and/or data stored in the non-volatile memory even after shipping of the microcomputer by the manufacturer after production, and a system and method for changing the memory contents of the memory in the microcomputer.

2. Description of the Related Art

FIG. 15 is a block diagram showing a configuration of a conventional microcomputer composed of an IC card interface section connected so as to be in communication with an external apparatus comprising an IC card, and a non-volatile memory which stores a CPU program executed by a CPU.

In FIG. 15, reference numeral 100 designates a conventional microcomputer having an IC card interface 190 which connects to an external apparatus comprising an IC card, a program memory 120 which stores a CPU program, and other programs; 110 designates a CPU which executes the CPU program stored in the program memory 120; 120 designates a program memory which stores a CPU program executed by the CPU 110; 130 designates a data memory which stores data to be used when the CPU program is executed. For example, data such as personal information and password, control data such as file ID for user data control, and other similar data. The program memory 120 and the data memory 130 are non-volatile memories such as EEPROMs.

Reference numeral 140 designates a data memory which is a RAM temporarily storing data read from the data memory 130 when the CPU 110 executes the CPU program, or data obtained from execution of the CPU and 150 designates a ROM storing a boot program which executes writing, or storing, of the CPU program stored in the program memory 120.

Reference numeral 160 designates a programming inhibition circuit in which a boot program stored in the ROM 150 is set to a state in which the CPU 110 made unavailable to allow the CPU program, which is written in the program memory 120 during the production of the microcomputer 100, to be set to "NO CHANGE". Reference numeral 170 designates an encryption circuit which verifies using encryption key data and similar data so as to determine whether or not the external apparatus, connected via a port 180, or an external apparatus, including an IC card connected via an IC card interface 190, corresponds to a predetermined counterpart with which communication can be established.

Reference numeral 180 designates a port connected so as to be in communication with an external apparatus; 190 designates an IC card interface which is connected so as to be in communication with an external apparatus comprising the IC card and which operates the IC card in synchronization with the microcomputer 100 by supplying power supply and clock signals; and 200 designates a bus, including a data bus, an address bus, and similar buses, connected to the aforementioned components in the microcomputer 100 to conduct the transmission/reception of control signals and data.

The operation will be next described below.

Since the present invention is characterized by allowing the CPU program of microcomputers to be changeable even after the microcomputers have been shipped, a write operation of the CPU program during the production of the conventional microcomputer 100 herein will be described.

The CPU program executed by the CPU 110 performs functions relating to the purpose for which the microcomputer 100 was designed. The CPU program matching the purpose of the microcomputer 100 is installed in the program memory 120 during the production of the microcomputer 100. The install operation is conducted by executing the boot program in which the CPU 110 reprograms or writes the contents of the program memory 120.

The above-mentioned operation will be described specifically.

First, connected with the microcomputer is a program load apparatus (not shown) which transmits the CPU program to be stored in the program memory 120 via the port 180 or IC interface 190. Then, when the CPU 11 executes the boot program stored in the ROM 150, the CPU program and data to be stored in the data memory 130 are received from the program load apparatus. Thus, the portion of the received data that is the CPU program is loaded to the program memory 120, and the other data is loaded into the address of the data memory 130 in which it is to be stored. When the storing of the data including the CPU program to the program memory 120 and the data to the data memory 130, is completed, the boot program operates the programming inhibition circuit 160. The programming prohibition circuit 160 writes status information, which inhibits the use of the boot program, in the program memory 120. As a result, the contents of the program memory 120 will never be changed again. Note that the data memory 130 may be changed independently from the program written in the program memory 120.

As described above, when the microcomputer 100 is set such that reprogramming the CPU program (which is written during the production of the microcomputer 100) is not possible, it is intended that the CPU program and information in the data memory 130 cannot be altered inaccurately (i.e., a malicious user cannot change the contents of the program memory 3 and data memory 4) after the microcomputer 100 is shipped.

The operation of the IC card interface 190 will be next described.

FIG. 16 is a block diagram showing the IC card interface of the conventional microcomputer as described above. In FIG. 16, reference numeral 210 designates a switch circuit which controls power to be supplied from the power supply 220 of the microcomputer 100 to the IC card. The same reference numerals above denote the same components as those of FIG. 15 and these redundant descriptions will be omitted.

The summary will be next described.

The IC card (not depicted) connected with the microcomputer 100 via the IC card interface 190 is supplied with ground potential via a GND terminal, and supplied with power supply voltage Vcc from the power supply 220 via the switch circuit 210. Then, the operation clock signal is supplied from a CLK terminal for synchronous control of the microcomputer 100, and a reset signal is supplied from a RST terminal to initialize the operation of the microcomputer inside the IC card. Thereafter, when the reset status is released by a reset signal having a low ("L") level, the IC card returns a discrimination signal via an input/output terminal denoted by I/O in FIG. 16. The microcomputer 100 recognizes the discrimination signal, and the microcomputer 100 and IC card are set to be in a condition so as to communicate with one another via the input/output terminal denoted by I/O. The encryption circuit 170 shown in FIG. 15 verifies whether or not that IC card is a predetermined IC card which should be permitted to communicate with the microcomputer 100. Specifically, the circuit 170 checks as to whether the microcomputer 100 and the above IC card have common encryption key data or not, and determines that the IC card is the above predetermined IC card when they have common encryption key data.

Since the conventional microcomputer with such an arrangement cannot change information of the CPU program and the data memory 130 after the microcomputer 100 is shipped, it has a problem that inadequacies of the CPU program and data memory 130 cannot be changed when these inadequacies are found after the microcomputer 100 is shipped.

In addition, there is a problem that even when a version change is provided for the functions of the CPU program, a revision for the microcomputer after shipping cannot be carried out.

Further, since the microcomputer 100, incorporating the conventional IC card interface 190, does not feed the power supply to the IC card while taking into consideration the power supply voltage of the microcomputer 100, a drop in the power supply voltage of the microcomputer 100 occurs when power is supplied to the IC card, so that the operation of the microcomputer 100 may become unstable. Thus, there is a problem that since the verification operation of the IC card, e.g., by means of the encryption circuit 170, becomes unstable, there occurs an inconvenience in that the microcomputer 100 can not verify even the predetermined IC card.

Specifically, the above-mentioned problem will be described.

FIG. 17 is a graph showing relationships between respective power supply voltages of the IC card and the conventional microcomputer, and time of passage from the beginning of feeding the power supply voltage to the IC card at the IC card interface section in FIG. 16. In FIG. 17, a dotted line denoted by symbol "b" designates a power supply voltage value of the microcomputer 100, and a dotted line denoted by symbol "c" designates a power supply voltage value of the IC card.

As shown in FIG. 17, since the conventional microcomputer 100 does not feed the power supply to the IC card by taking into consideration of its own power supply voltage, the power supply voltage drops in accordance with an increase of the power supply voltage to the IC card upon feeding of the power supply to the IC card. Such a drop of the power supply of the microcomputer 100 causes an unstable operation, resulting in the aforementioned inconveniences.

SUMMARY OF INVENTION

The present invention is implemented to solve the foregoing problems. It is therefore an object of the present invention to provide a microcomputer when an external apparatus connected via an IC card interface section is set so as to be in communication with the microcomputer, a program load apparatus is discriminated, or detected, based on a discrimination signal to be transmitted from the external apparatus, and the contents of memory which stores data, including a CPU program, may be changed even after the microcomputer has been shipped.

In addition, it is an object of the present invention to provide a microcomputer that can reduce unstable operation which may occur upon insertion of an external apparatus via an IC card interface section, when a power supply is fed to an IC card taking into consideration the a power supply voltage of the microcomputer.

Further, it is an object of the present invention to provide a system for changing the memory contents of a microcomputer when an external apparatus connected via an IC card interface section is set so as to be in communication with the microcomputer, a program load apparatus is detected based on a discrimination signal to be transmitted from the external apparatus, and the contents of a memory which stores data containing a CPU program may be changed even after the microcomputer has been shipped.

According to a first embodiment of the present invention, a microcomputer is provided comprising: a memory for storing data, including a CPU program to be executed by a CPU; an IC card interface section adapted to be connected with an external apparatus comprising an IC card; a discrimination information storing unit which is set in advance with information associated with a discrimination signal which may identify the external apparatus connected via the card interface section; external apparatus discrimination means for discriminating the external apparatus when it is connected to the IC card interface section by comparing the discrimination signal with the information associated with the discrimination signal which is set in the information storing unit, when a power supply, a clock signal and initializing of an operation are fed to the external apparatus which is connected so as to be in communication with the microcomputer via the IC card interface section; and memory contents change means for executing the changing contents of the memory by receiving new data from the external apparatus when the external apparatus discrimination means discriminates, based on the discrimination signal, that an external apparatus which is adapted to send data associated with the changing of the contents of the memory is connected via the IC card interface section.

According to this exemplary embodiment of the invention, the microcomputer may comprise: a port section connected so as to be in communication with an external apparatus; and port status validation means for discriminating whether or not the port section is in a connection status corresponding to a time for changing contents of the memory, and the memory contents change means may receive the data from the external apparatus which transmits the data associated with the changing of contents of the memory and executes the changing of the contents of the memory, when the port status validation means discriminates that the port section is in the connection status corresponding to the time for changing contents of the memory.

According to this exemplary embodiment of the invention, the microcomputer may comprise delay control means for delaying the start of an operation by the IC card connected via the IC card interface section starts an operation, for the period of time in which the memory means requires to change the contents of the memory.

According to this exemplary embodiment of the invention, the microcomputer may comprise: a reload program storing unit for storing a reload program which when executed changes the CPU program stored in the memory; and programming inhibition means for inhibiting use of the reload program; and memory contents change means capable of releasing the inhibition of the reload program set by the programming inhibition means and executing the changing of the contents the memory based on the reload program, when the external apparatus discrimination means discriminates, based on the discrimination signal, that an external apparatus which may transmit the data associated with the changing of the contents of the memory is connected to the microcomputer via the IC card interface section.

According to this exemplary embodiment of the invention, the microcomputer may comprise power supply feed means for feeding power in stages up to a power value in which the external apparatus including the IC card and connected via the IC card interface section starts to be operable.

According to a second embodiment of the present invention, a system for changing memory contents of a microcomputer is provided comprising: a memory for storing data containing a CPU program executed by a CPU; and an IC card interface section connected so as to be in communication with an external apparatus including an IC card, further including connection means for connecting the microcomputer with the IC card interface section, and a program load apparatus for creating data associated with a changing of the contents of the memory to transmit the created data to the microcomputer, wherein the microcomputer includes: a discrimination information storing unit which is set in advance with information associated with a discrimination signal which may identify the external apparatus connected via the IC card interface section; external apparatus discrimination means for discriminating the external apparatus when it is connected to the IC card interface section by comparing the discrimination signal with the information associated with the discrimination signal which is set in the discrimination information storing unit, when a power supply, a clock signal and initializing of an operation are fed to the external apparatus which is connected so as to be in communication with the microcomputer via the IC card interface section; and memory contents change means for executing the changing of the contents of the memory by receiving the data associated with the changing of the contents of the memory from the program load apparatus, when the external apparatus discrimination means discriminates that the program load apparatus is connected via the IC card interface section based on the discrimination signal.

According to this exemplary embodiment of the invention, the microcomputer may include: a port section connected so as to be in communication with the external apparatus; and port status validation means for discriminating whether or not the port section is in a connection status corresponding to a time for changing contents of the memory is previously set, and the memory contents change means may receive the data from the external apparatus which transmits the data associated with the changing of the contents the memory and executes the changing of the contents of the memory, when the port status validation means discriminates that the port section is in the connection status corresponding to the time for changing contents of the memory.

According to this exemplary embodiment of the invention, the program load apparatus and microcomputer may each include verification means for encrypting data to be transmitted, sharing cipher key data which may decrypt received data, and verifying a counterpart to transmit/receive data with one another based on the cipher key data, and the memory contents change means may receive and decrypt the data which is associated with the changing of the contents of the memory and wherein the program load apparatus encrypts with the cipher key data, and executes the changing of the contents of the memory, when the verification means verifies that the program load apparatus which the external apparatus discrimination means determines is connected to the microcomputer via the IC card interface section is a counterpart with which data can be transmitted/received.

According to this exemplary embodiment of the invention, the memory contents change means may reload so as to be applicable to only a mutual verification between the program load apparatus and the microcomputer after changing the contents of the memory.

According to this exemplary embodiment of the invention, the microcomputer may include delay control means for delaying starting of an operation by the IC card connected via the IC card interface section, by a period of time in which the memory contents change means takes to change the contents of the memory.

According to this exemplary embodiment of the invention, the microcomputer may include: a reload program storing unit for storing a reload program which may execute a change of the data containing the CPU program stored in the memory; and programming inhibition means for inhibiting use of the reload program, and the memory contents change means may release use inhibition of the reload program set by the programming inhibition means, and executes the changing of the contents of the memory based on the reload program, when the external apparatus discrimination means discriminates, based on the discrimination signal, that a program load apparatus is connected to the microcomputer via the IC card interface section.

According to a third embodiment of the present invention, a method for changing memory contents of a microcomputer is provided which includes: a memory for storing data containing a CPU program executed by a CPU; and an IC card interface section connected so as to be in communication with an external apparatus including an IC card, the method comprising: an initialization step of setting a status of the external apparatus to be in communication with the microcomputer by feeding a power supply, a clock signal and initializing of an operation to the external apparatus connected via the IC card interface section; an external apparatus discrimination step of discriminating whether the external apparatus is connected to the microcomputer based on a discrimination signal to be transmitted from the external apparatus after the initialization step; and a step of changing the memory contents, when a program load apparatus, which may transmit data associated with the changing of the contents of the memory, is discriminated to be connected via the IC card interface section at the external apparatus discrimination step, receiving the data from the program load apparatus and executing the changing of the contents of the memory.

BRIEF DESCRIPTION OF THE DRAWINGS FIGURES

FIG. 4A shows a general constitution; and FIG. 4B is a circuit diagram showing a level conversion circuit.

FIG. 14A is a view showing an operation on IC card insertion to the IC card information processor; and FIG. 14B is a view showing a constitution of an IC card interface section.

DETAILED DESCRIPTION OF THE INVENTION

An embodiment of the present invention will be described below.

First Embodiment

Figure 1:
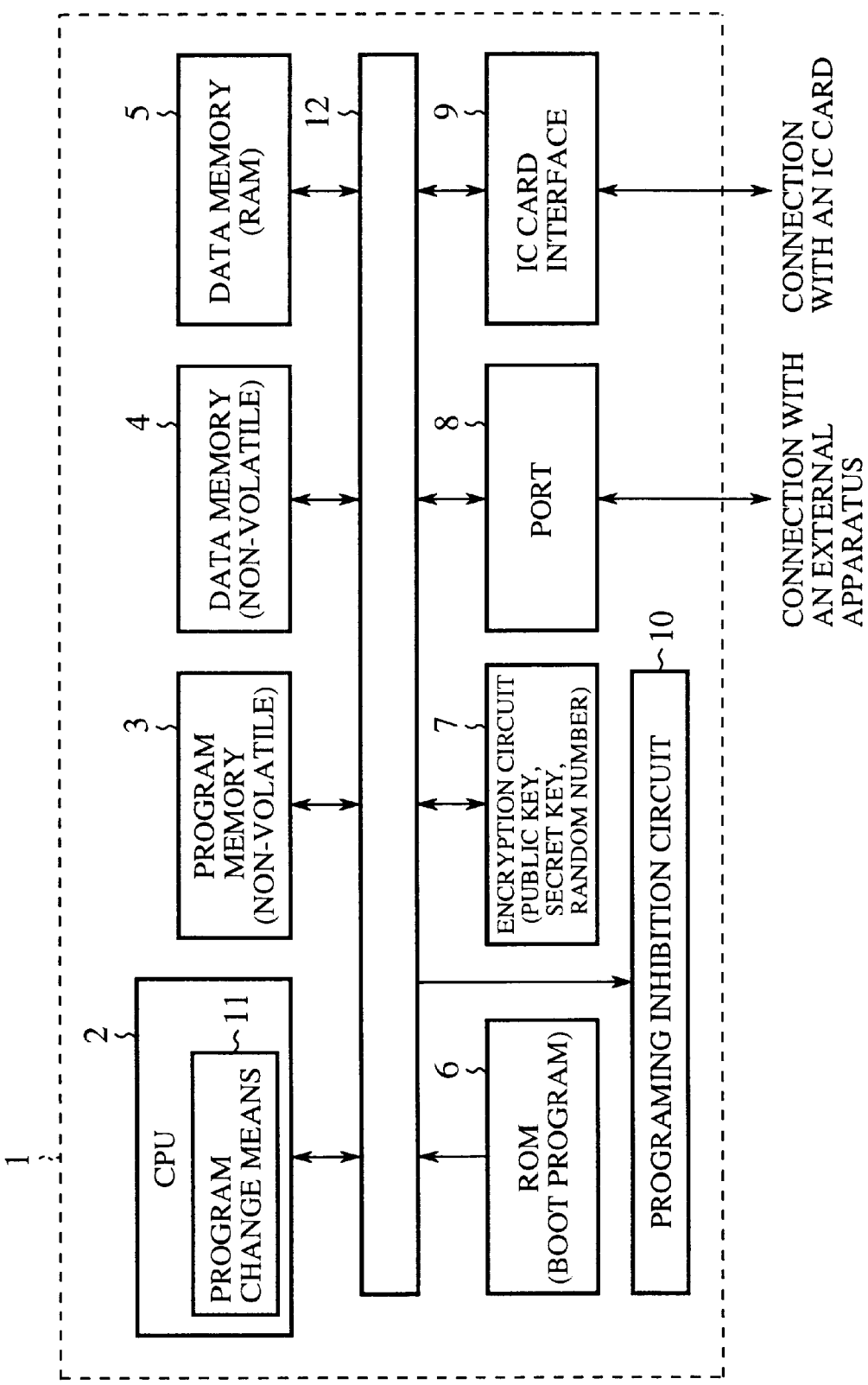
FIG. 1 is a block diagram showing a configuration of a microcomputer in accordance with a first embodiment of the present invention.

FIG. 1 is a block diagram showing a configuration of a microcomputer in accordance with a first embodiment of the present invention. In FIG. 1, reference numeral 1 designates a microcomputer; reference numeral 2 designates a CPU (external apparatus discrimination means, memory contents changing means) which executes a CPU program stored in a program memory 3; and reference numeral 3 designates a program memory which stores a CPU program executed by the CPU 2, and comprised of an electrically reprogrammable, non-volatile memory such as an EEPROM. The program memory 3 also stores a program change routine for changing the contents of the memory (described later) in addition to the CPU program.

Reference numeral 4 designates a data memory (memory, discrimination information memorizing section) which stores data to be used when the CPU 2 executes the CPU program, for example user data such as personal data and password, control data such as file ID for user data control, and so on. A non-volatile memory is employed for the data memory 4 as well as for the program memory 3. Information relating to a discrimination signal which can specify, or identify, an external apparatus connected via an IC card interface 9 is set previously in the data memory 4.

Reference numeral 5 designates a data memory including a RAM which temporarily stores data read from the data memory 4 or data obtained as an execution result when the CPU 2 executes the CPU program; 6 designates a ROM which stores a boot program for executing writing, or storing, of the CPU program in the program memory 3; reference numeral 7 designates an encryption circuit which verifies with encryption key data and similar data whether or not the external apparatus connected via a port 8 and/or the external apparatus comprising the IC card via an IC card interface 9 corresponds to a predetermined counterpart with which communication can be established; reference numeral 8 designates a port (port section) that is connected so as to be in communication with an external apparatus; reference numeral 9 designates an IC card interface (IC card interface section) which is connected so as to be in communication with the IC card and which operates the IC card in the microcomputer 1 by supplying power supply and clock signals.

Reference numeral 10 designates a programming inhibition circuit which inhibits the use of the boot program stored in ROM 6 by setting the state, which is written in the program memory 3 during the production of the microcomputer 1, set to "NO CHANGE"; reference numeral 11 designates a program contents change means (external apparatus discrimination means, memory contents change means) which is incorporated in the CPU 2, and which detects the presence of a program load apparatus based on the discrimination signal transmitted from the external apparatus when the external apparatus connected via the IC card interface 9 is set so as to be in communication with the microcomputer 1, thereby allowing the information contents of the program memory 3 storing the CPU program and the data memory 4 to be changed even after the microcomputer is shipped; and reference numeral 12 designates a bus including data bus, address bus, and similar buses, connected to the aforementioned components in the microcomputer 1 to conduct the transmission/reception of control signals and data.

Figure 2:
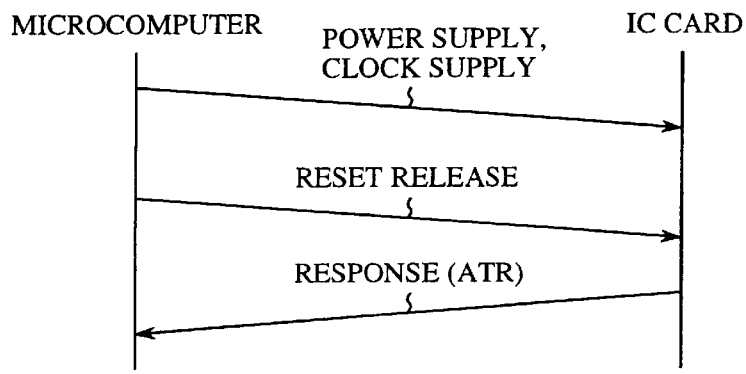
FIG. 2 is an explanatory timing diagram of data transmission/reception with respect to an external apparatus including an IC card connected with an IC card interface section in the microcomputer in accordance with the first embodiment.

FIG. 2 is a schematic showing timings of data transmission/reception to the external apparatus including the IC card connected with the IC card interface section 9 in the microcomputer in accordance with the embodiment 1.

The operation will be described next.

First, connected with the microcomputer is a program load apparatus, i.e., an external apparatus, (not shown)

which transmits the CPU program to be stored in the program memory 3 via either the port 8 or IC card interface 9. Then, when the CPU 2 executes the boot program stored in the ROM 6, the CPU program and data to be stored in the data memory 4 are received from the program load apparatus. Thus, the received data such as the CPU program is loaded into the program memory 3 and the data is loaded into the address of the data memory 4 in which it is to be stored. When the storing of the data, including the CPU program, to the program memory 3 and the data to the data memory 4 is completed, the boot program operates the programming inhibition circuit 10. The programming prohibition circuit 10 writes status information, which inhibits the use of the boot program, in the program memory 3.

The change operation of the CPU program will be described next.

Figure 3:
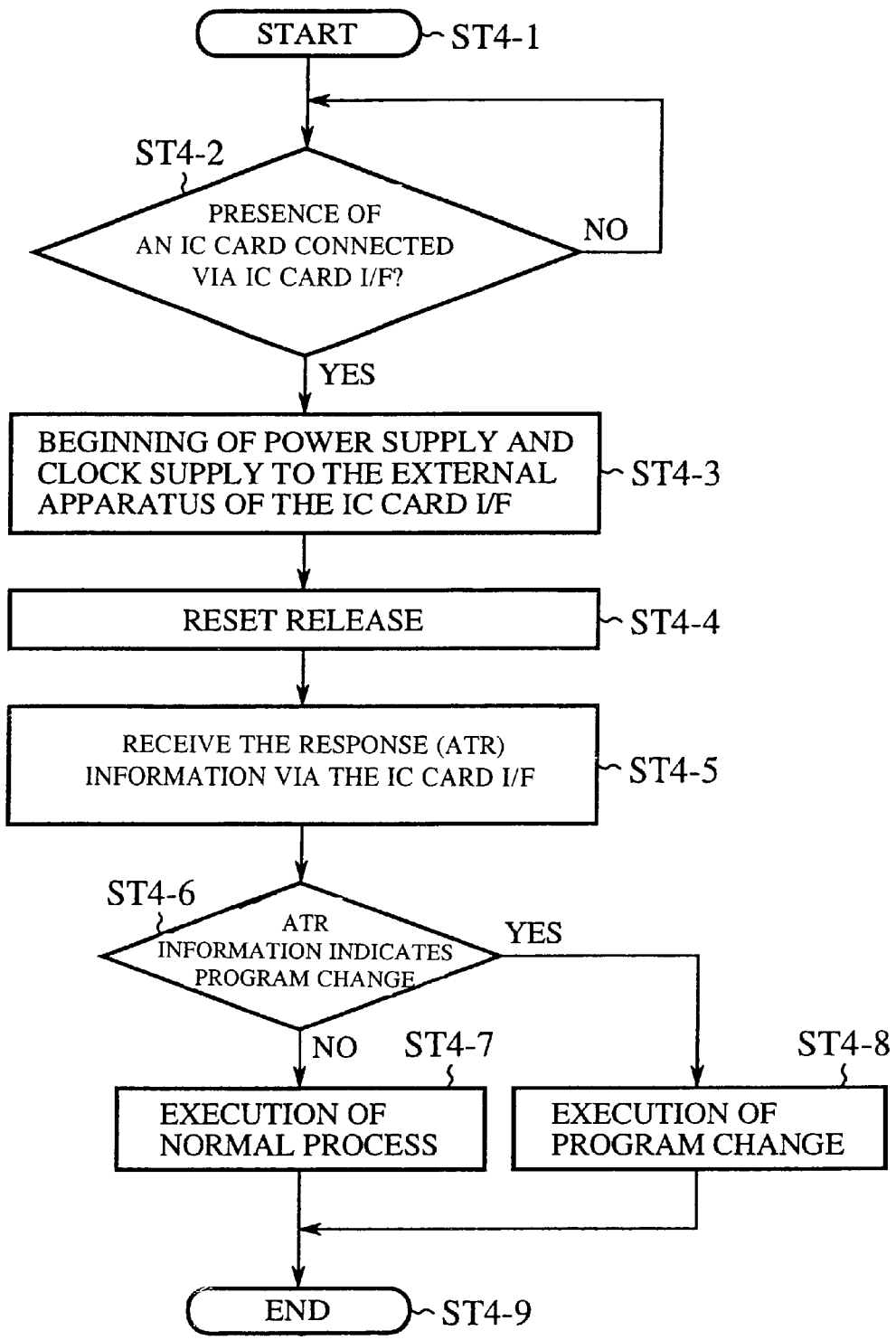
FIG. 3 is a flow chart showing memory contents change operations of the microcomputer in accordance with the first embodiment.

FIG. 3 is a flow chart showing operations of the microcomputer to change the contents of the memory in accordance with the first embodiment. Referring to this flowchart together with FIGS. 1 and 2, the description is as follows.

First, the external apparatus, such as the IC card (not shown) connected via the IC card interface 9, is connected with the microcomputer 1 (step ST4-1). Then, a verification operation is conducted via the IC card interface 9 as to whether or not the above external apparatus is connected therewith via the IC card interface 9 (step ST4-2). At this time, the flow goes to step ST 4-3 when the above external apparatus is connected via the IC card interface, or the verification operation is conducted again by returning to step ST4-2 when the external apparatus is not connected. At step ST4-2, when the connection of the above external apparatus is verified, ground potential, power supply potential, an operation clock signal, and a reset signal which is set to a low ("L") level are supplied to the above external apparatus (step ST4-3, initialization step) by the CPU 2 in the microcomputer 1 (as also shown in FIG. 2), whereby the operation of a microcomputer in the external apparatus is initialized or reset. Subsequently, the reset status is released when the above reset signal is set to a high ("H") level (step ST4-4, initialization step). The microcomputer 1 and the external apparatus are set so as to be in communication with one another through these operations (activation). Thereafter, the above external apparatus returns ATR information, which is a self-specifying, that is, a self-identifying, discrimination signal, to the microcomputer 1 (step ST 4-5).

When the external apparatus connected with the microcomputer 1 via the IC card interface 9 is a normal IC card, specific data in conformity with ISO (International Standard Organization) standard is returned as the above ATR information to the microcomputer 1. When the microcomputer 1 receives the ATR information in conformity with the ISO standard which specifies the IC card, the CPU 2, which functions as the external apparatus discrimination means, determines the type of external apparatus which is connected by reading the ATR information which is information relating to the discrimination signal which specifies, or identifies, the above external apparatus (step ST 4-6, external apparatus discrimination step). At this time, when the ATR information is in conformity with the ISO standard, the CPU 2 determines that the above external apparatus is the IC card, and executes a normal mode processing (step ST 4-7).

On the other hand, when it is determined that the ATR information is not in conformity with the ISO standard, the external apparatus is determined to correspond to the program load apparatus which transmits data associated with changing of the contents of the data memory 4 and the program memory 3. Thus, the microcomputer 1 is determined to be connected with the program load apparatus via the IC card interface 9, and then the program change means 11 incorporated in the CPU 2 begins to execute the program change routine stored in the program memory 3 (step ST4-8, memory contents change step). The program change routine is a program, which is provided in addition to the boot program stored in the ROM 6, so as to execute changing of the memory contents in the microcomputer 1 after shipping thereof.

In the step ST 4-8, in accordance with the program change routine, the microcomputer 1 receives the data associated with the changing of the contents of the program memory 3 and the data memory 4 from the program load apparatus via the IC card interface 9, and loads the data to addresses of a memory (e.g., data memory 5) other than the data memory 4 and program memory 3 previously set in the program change routine, to complete an operation of the changing of the memory contents of the microcomputer 1 (step ST4-9). Since the program change routine executed by the program change means 11 incorporated in the CPU 2 is stored in the program memory 3, the above data is written temporarily in the other memory, and the changing of the memory contents is executed via the bus 12 after the download is completed.

A memory contents change system of the microcomputer according to the first embodiment will be described next.

Figure 4A:
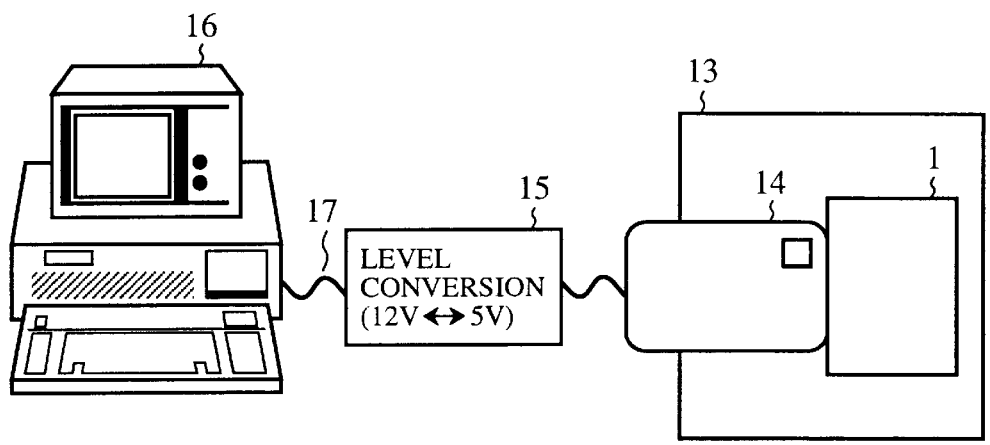
FIGS. 4A and 4B are schematics of a constitution of a memory contents change system in the microcomputer in accordance with the first embodiment of the present invention.
Figure 4B:
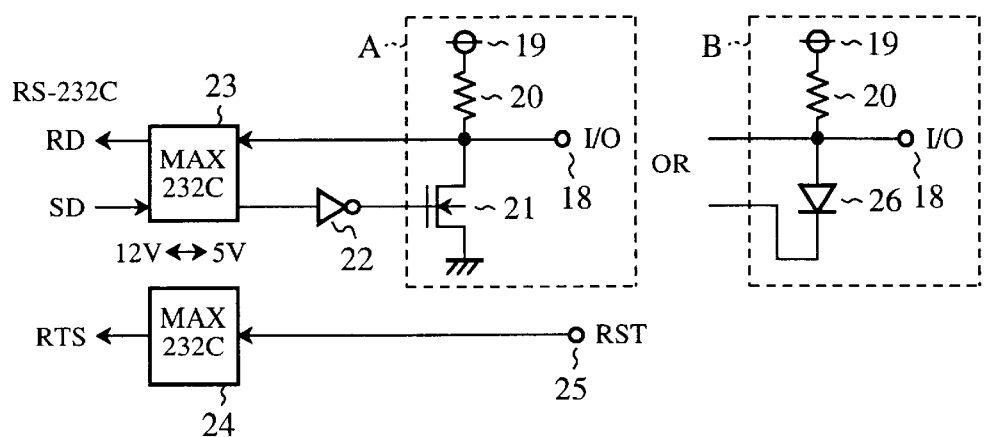

FIGS. 4A and 4B are a view showing schematically a constitution of the system for changing the memory contents in the microcomputer: FIG. 4A shows a general constitution; and FIG. 4B is a circuit diagram showing a level conversion circuit. In FIGS. 4A and 4B, reference numeral 13 designates an information processor for IC cards mounted on the microcomputer 1, and is considered to be an IC card reader/writer; 14 designates an IC card-type connector (external apparatus, program load apparatus) corresponding to an IC card insertion section and connected with a level conversion circuit 15 via a signal line 17.

Reference numeral 15 designates a level circuit (external apparatus, program load apparatus) which transmits data associated with the changing of the contents of the program memory 3 and data memory 4 produced in the personal computer 16; reference numeral 16 designates a personal computer (external apparatus, program load apparatus) which produces the data associated with the changing of the contents of the program memory 3 and data memory 4 and which transmits/receives data in RS232C form; and reference numeral 18 designates an input/output terminal of the level conversion circuit 15 which is connected with the data input/output terminal I/O of the IC card interface 9 of the microcomputer 1 via the IC card-type connector 14.

Reference numeral 19 designates a power supply for setting data transmitted/received by the level conversion circuit 15 to a H level (data of value 1); reference numeral 20 designates a pull up resistor connected with the power supply 19 and a N-channel transistor; reference numeral 21 designates a N-channel transistor for switching the data transmitted/received by the level conversion circuit 15 to a H level or a L level (data of value 0); reference numerals 23 and 24 each designate an interface means (MAX232C) and convert serial data form from the personal computer 16 and data in RS232C form from one form to the other and switch appropriately a potential level of the data to be transmitted/received to 5 volts or 12 volts.

Reference numeral 25 designates a reset terminal RST of the level conversion circuit 15 which is connected with the reset terminal RST of the IC card interface 9 of the microcomputer 1 via the IC card-type connector 14; reference numeral 26 designates a diode for switching the data transmitted/received by the level conversion circuit 15 to a H level or a L level. Two circuits denoted by symbols A and B, each surrounded by a broken line, may be replaced with each other. The same reference numerals as those of FIG. 1 are denoted by the same components, and these redundant explanations will be omitted.

The operation will be described next.

When the IC card-type connector 14 is provided in the IC card information processor 13, a verification operation is executed via the IC card interface 9 by the microcomputer 1 as to whether or not the external apparatus is connected to the connector 14. Thus, when the placement of the program load apparatus to the microcomputer 1 is verified, a reset signal with a L level is supplied to the program load apparatus. Ground potential, power supply voltage, and an operation clock signal supplied from the microcomputer 1 are transmitted to the interface means 23 and 24. The interface means 23 and 24 form part of the program load apparatus.

The reset signal is output to the reset terminal RTS of the personal computer 16 via the RST terminal of the IC card interface 9 and the interface means 24. Thereafter, when the microcomputer 1 sets the above reset signal to a H level and releases the reset status, the reset release is detected by a CPU (not depicted) in the personal computer 16 at the RTS terminal. The personal computer 16 returns ATR information from its data transmission terminal SD in response to the release reset. The data used as the ATR information, such as 00H, is not in conformity with the ISO standard.

When the microcomputer receives ATR information from the external apparatus, the CPU 2 reads the ATR information which was set previously in the data memory 4 and which corresponds to the external apparatus connected via the IC card interface 9, and compares the former, received, ATR information with the latter, preset, ATR information. If they match, the external apparatus is determined to be the program load apparatus, and the program change means 11 executes the program change routine stored in the program memory 3.

Specifically, the CPU 2 executes the program change routine, and sets the input/output terminal I/O of the IC card interface 9 to be in a status to be able to send the data associated with the changing of the contents of the program memory 3 and the data memory 4, and outputs a signal to permit transmissions of the data to the program load apparatus via this input/output terminal.

Such a data transmission permission signal from the microcomputer 1 is input to the personal computer 16 via the input/output terminal I/O 18 and data reception terminal RD of the IC card-type connector 14 that is connected to the input/output terminal I/O of the IC card interface 9. In such a way, the data associated with the changing of the contents of the program memory 3 and data memory 4 is output from the personal computer as serial data to the microcomputer 1 via the RS232C.

Specifically, the above data output from the data transmission terminal SD of the personal computer 16 is converted to data in RS232C form by the interface means 23 to be input to the level conversion circuit 15. A case where the level conversion-circuit 15 is constituted by the circuit A will be described.

When the data from the data transmission terminal SD is at a L level, it is inverted to a H level by the inverter 22, and inputted to the gate electrode of the N-channel transistor 21 to bring it to an ON state. In such a way, the terminal I/O 18 changed to a H level by the power supply 19 and pull-up resistor 20 is grounded and starts to transmit data of a L level.

On the other hand, when the data from the data transmission terminal SD is at a H level, it is inverted to a L level by the inverter 22, and inputted to the gate electrode of the N-channel transistor 21 to bring it to an OFF state. In such a way, the terminal I/O 18 starts to transmit data of a H level by the power supply 19 and pull-up resistor 20.

With a combination of these operations, the data associated with the changing of the contents of the program memory 3 and data memory 4 from the personal computer 16 is outputted to the microcomputer 1.

In addition, even when the level conversion circuit 15 is constituted by the circuit B, the diode 26 instead of the N-channel transistor 21 switches the H level or L level of the data passing through the terminal I/O 18 and outputs the resultant level to the microcomputer 1.

When the microcomputer 1 receives the data associated with the changing of the contents of the program memory 3 and data memory 4, it loads the data to an address in a temporarily storable memory (e.g., data memory 5), other than the program memory 3 and data memory 4, which previously has been set in the program change routine. The contents of the program memory 3 and data memory 4 may be changed in accordance with the contents in the temporarily storable memory by appropriate readouts.

The aforementioned embodiment describes the program load comprising the level conversion circuit 15, the personal computer 16, and other circuits, however one skilled in the are would appreciate that the present invention is not limited to this embodiment. For example, the program load apparatus may be an IC card having a program load function.

When the program load apparatus is an IC card having a program load function, the microcomputer in the IC card must be set to return ATR information of a value different from a normal IC card in conformity of the ISO standard after the reset release, in order for the external apparatus discrimination means to detect that the IC card is to function as a program load apparatus.

As described above, according to the first embodiment, there is provided with the program memory 3 and the data memory 4, each storing data containing the CPU program to be executed by the CPU 2, the IC card interface 9 which may be connected in communication with the external apparatus including an IC card, and a discrimination information storing unit which is set previously with information associated with a discrimination signal which may specify the external apparatus connected with the data memory 4 via the IC card interface 9.

The CPU 2 functions as an external apparatus discrimination means which, when the external apparatus connected via the IC card interface 9 is set to be in communication with the microcomputer 1 by supplying the power supply and clock signals and performing initialization of operations, detects the external apparatus by comparing the discrimination signal transmitted from the external apparatus with information associated with the discrimination signal set in the data memory 4.

Further, when the CPU 2 determines that the external apparatus which transmits data associated with the changing of the contents of the memory via the IC card interface 9 is connected based on the discrimination signal, the CPU 2 also has a function as memory contents change means which may execute the changing of the contents of the memory by receiving the data associated with the changing of the contents of the memory from this external apparatus. Accordingly, the contents of the program memory 3 and data memory 4 may be changed even after shipping of the microcomputer 1 without arranging a particular communication port for the program load apparatus, thereby dealing with amendments to the CPU program found to be necessary after shipping and version changes of the functions of the CPU program.

In addition, according to the system for changing the memory contents of the microcomputer of the first embodiment, an IC card-type connector 14 is provided which is connected to the IC card interface 9, and to the program load apparatus, including the level conversion circuit 15 and the personal computer 16, which produces data associated with changing of the memory contents and transmits the data. The microcomputer 1 includes the IC card interface 9 connected so as to be in communication with the external apparatus including the IC card. The information related to the discrimination signal that may specify the external apparatus connected via the IC card interface 9 is stored previously in the data memory 4.

When the system is set so that there is communication between the external apparatus and the microcomputer by feeding the power supply, clock signal and initializing operations with respect to the external apparatus connected via the IC card interface 9, the CPU 2 has a function as an external apparatus discrimination means for discriminating the type of the external apparatus by comparing the discrimination signal transmitted from the external apparatus with the information related to the discrimination signal stored in the data memory 4, and further the CPU 2 has another function as a memory contents change means which receives data associated with the changing of the memory contents from the program load apparatus and executes the changing of the memory contents when the CPU 2 detects a connection of the program load apparatus via the IC card interface 9 based on the discrimination signal.

In such a way, the same effect as described above is obtained, and further the program load apparatus may be performed by employing the level conversion circuit 15 with a simple constitution, provided with the input/output terminal 18 corresponding to the microcomputer 1 and the RTS terminal for detecting reset release, and the commercially available personal computer 16, thereby building the memory contents change system of the microcomputer 1 at a low cost.

Second Embodiment

In a second embodiment of the invention, a program load apparatus and a microcomputer share encryption key data for encrypting data to be transmitted and decrypting received data, and each includes a verification means for verifying whether to transmit and receive data from one another based on the encryption key data.

When the verification means determines that a connection via an IC card interface section which was determined by an external apparatus discrimination means is a counterpart program load apparatus with which data can be transmitted/received, the memory contents change means receives and decrypts data associated with the changing of the contents of the memory which are encrypted by use of the encryption key data, thus executing the changing of the contents of the memory.

Figure 5:
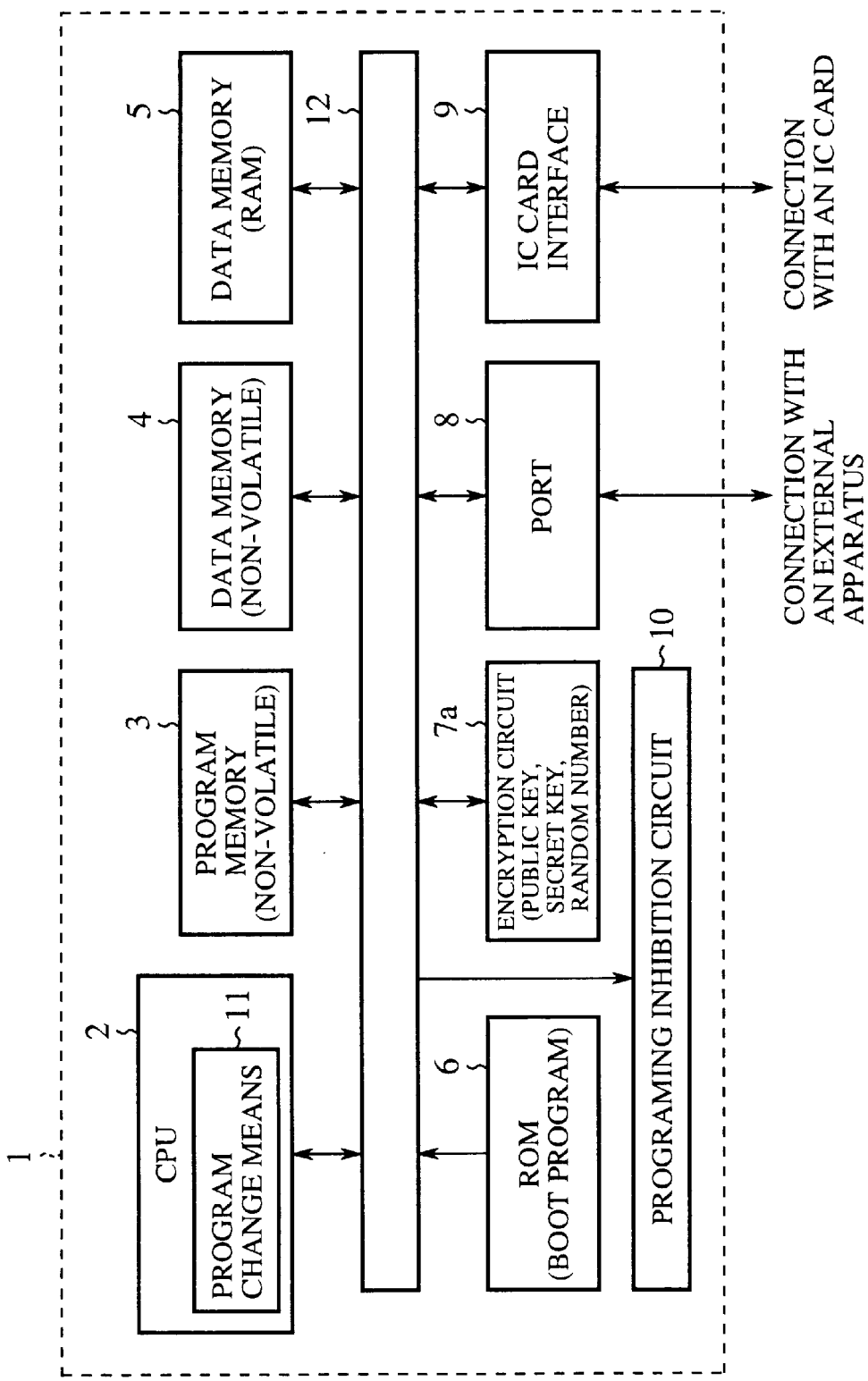
FIG. 5 is a block diagram showing a configuration of a microcomputer in accordance with a second embodiment of the present invention.

FIG. 5 is a block diagram showing a configuration of a microcomputer according to the embodiment 2 of the present invention. In FIG. 5, reference numeral 7a designates an encryption circuit (verification means) which shares the cipher key data with the external apparatus including the IC card connected via the IC card interface 9 and which verifies whether or not the external apparatus including the above IC card is a predetermined counterpart with which communication can be establish based on the cipher key data under the CPU 2 control. The external apparatus which shares the cipher key data with the encryption circuit 7a will be described, as the drawing is omitted, based on one example of an IC card having a program load function including an encryption circuit which may operate in response to the encryption circuit 7a. The same reference numerals above are provided for the same components as those of FIG. 1, and their redundant explanations will be omitted.

Figure 6:
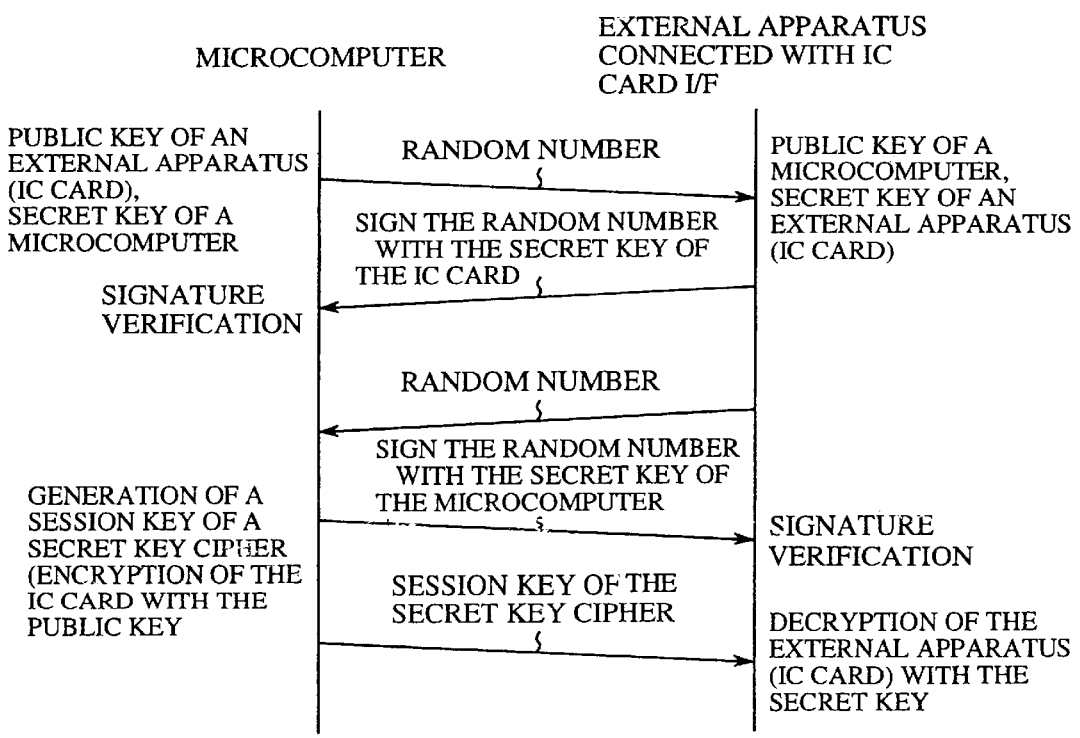
FIG. 6 is an explanatory timing diagram of data transmission/reception with respect to an external apparatus including an IC card connected with an IC card interface section in the microcomputer in accordance with the second embodiment.

FIG. 6 is a view showing timings of data transmission/reception with the external apparatus including the IC card and connected via the IC card interface section in the microcomputer according to the second embodiment.

The operation will be described next.

Since the invention of the present application is characterized in that the CPU program of the microcomputer is designed to be changeable even after shipping, and the operation which writes the CPU program in the program memory 3 during production of the microcomputer 1 is the same as the aforementioned prior art, operations of changing the CPU program herein will be described.

Figure 7:
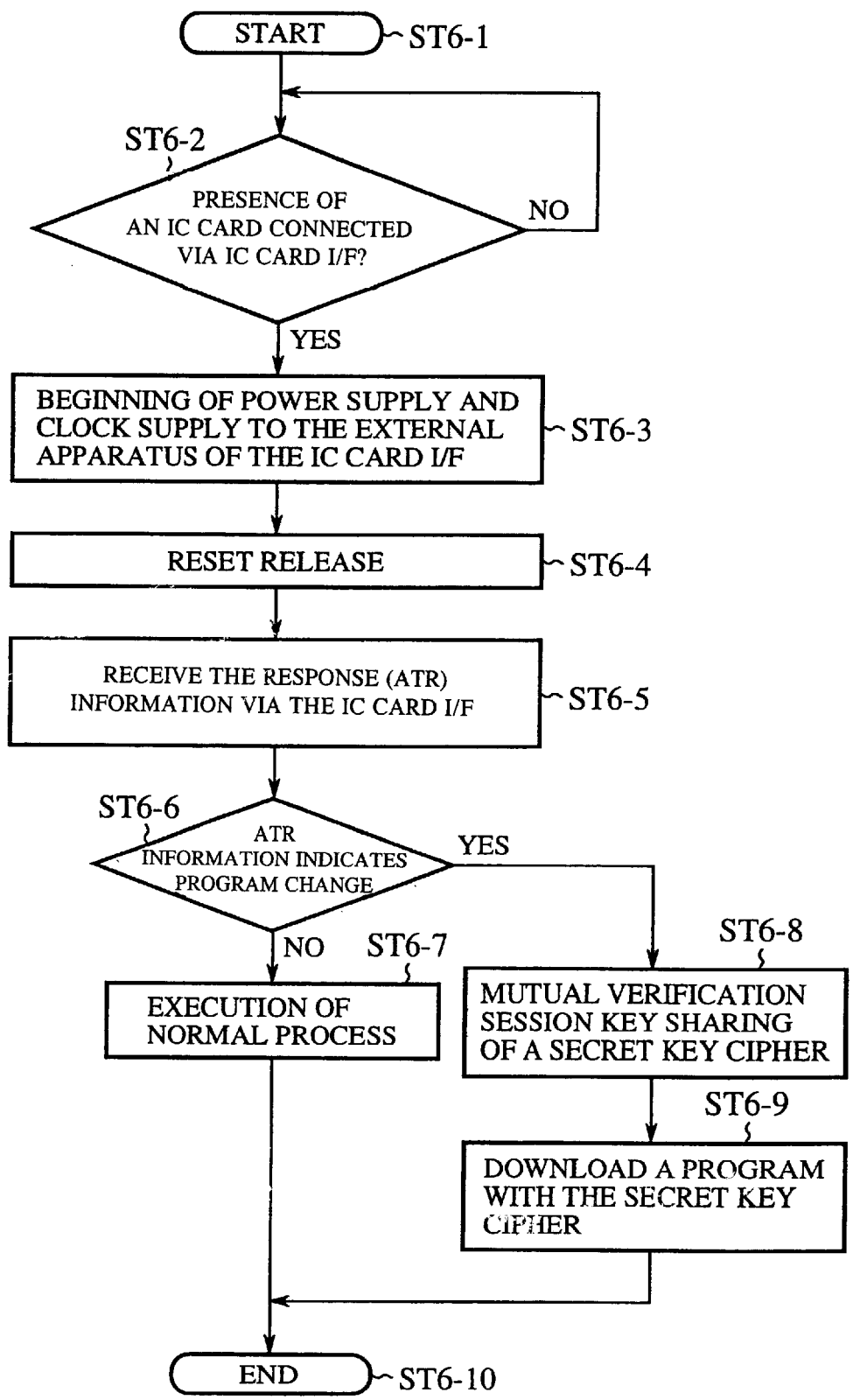
FIG. 7 is a flow chart showing memory contents change operations of the microcomputer in accordance with the second embodiment.

FIG. 7 is a flow chart showing operations of changing the contents of a memory in a microcomputer according to the embodiment 2. Referring to the flowchart together with FIGS. 5 and 6, the explanation will be given as follows.

First, an IC card (not depicted) connected via the IC card interface 9 is connected with the microcomputer 1 (step ST6-1). Next, a validation operation is performed to determine whether or not the IC card is connected with the IC card interface 9 (step ST6-2). Then, if the IC card is connected via the IC card interface 9, processing goes to step ST6-3, while if it is not connected, processing goes back to step ST6-2 to repeat the verification operation. When the connection of the IC card is validated at step ST6-2, ground potential, power supply voltage, operation clock signal, and reset signal, which are set to a L level, are supplied to the IC card (step ST6-3, initialization step). In such a way, the operation of the microcomputer contained in the IC card is initialized. Subsequently, the reset signal is set to a H level to release the reset status (step ST6-4, initialization step). The microcomputer 1 and the IC card are set to be in communication with each other (activation). Thereafter, the IC card returns ATR information that is a self-assigning, i.e., self-identifying, discrimination signal to the microcomputer 1 (step ST6-5).

Assuming the external apparatus connected via the IC card interface 9 is a normal IC card, the ATR information returned to the microcomputer 1 is data in conformity with the ISO (International Standard organization) standard. When the microcomputer 1 receives the ATR information assigning, or identifying, the IC card which is in conformity with the ISO standard, the CPU 2, functioning as the external apparatus discrimination means, reads the ATR information which has previously been set in the data memory 4 and which is associated with the discrimination signal assigning the external apparatus, and a comparison is made (step ST6-6, external apparatus discrimination step) with the ATR information received from the external apparatus. Then, when it is verified that this ATR information is in conformity with the ISO standard, the CPU 2 determines that the IC card is a normal IC card and executes a normal mode process (step ST6-7).

In order to recognize the IC card having a program load function for the microcomputer 1, ATR information not in conformity with the ISO standard is set previously in the IC card. In such a way, when the microcomputer 1 receives the ATR information in response to the reset release, the CPU 2 can determine that the external apparatus connected via the IC card interface 9 is an IC card having a program load function.

Thereafter, a mutual verification operation is made between the microcomputer 1 and the IC card having the program load function (step ST6-8). Specifically, as shown in FIG. 6, the encryption circuit 7a shares the public key data and secret key data as the cipher key data with the encryption circuit having the program load function. In addition, these key data have to be set in the corresponding data memory or similar memory. In this case, the public key data and secret key data are provided by one pair of cipher key data; data encrypted by the public key data can be decrypted or decoded by the secret key data, and vice versa.

Referring to FIG. 6, the operation will be described.

First, the encryption circuit 7a of the microcomputer 7a produces a random number to be transmitted to the IC card having the program load function. When the IC card having the program load function receives the random number, it encrypts the random number using its secret key data (signs to the random number) and returns the result to the microcomputer 1. When the microcomputer 1 receives the random number 1 encrypted using the secret key data of the IC card, the encryption circuit 7a decodes the number using the public key data and determines its conformity with the transmitted random number. In such a way, when it is verified to share the cipher key data comprised of the public key data and secret key data of the IC card. Alternatively, the encryption circuit of the IC card having the program load function produces a random number and transmits it to the microcomputer 1. When the microcomputer 1 receives the random number, it encrypts the number using its secret key data (signs the random number), and returns the result to the IC card having the program load function. When the IC card receives the random number encrypted using the secret key data, the encryption circuit decrypts the number using the public key data of the microcomputer 1 and determines its conformity with the transmitted random number. In such a way, it is verified that the cipher key data comprised of the public key data and secret key data of the microcomputer 1 is shared between the encryption circuit 7a of the microcomputer 1 and the encryption circuit of the IC card having the program load function.

As described above, when the mutual verification is completed between the microcomputer 1 and the IC card having the program load function, the microcomputer 1 produces session key data of the secret key cipher which is used temporarily when the IC card loads a program, and encrypts and transmits the session key data using the public key data of the IC card. The IC card obtains the session key data by decrypting the received encrypted data with the its secret key. In such a way, the session key data can decode the encrypted data, and vice versa.

Thus, when the microcomputer 1 and the IC card having the program load function share the session key data, the IC card encrypts the data associated with changing of the contents of the program memory 3 and the data memory 4 with the session key data and transmits the resulting encrypted data to the microcomputer 1(step ST6-9). When the microcomputer 1 receives the encrypted data, the encryption circuit 7a decrypts it with its session key data, and loads the decrypted data to an address of a memory (e.g., data memory 5) other than the program memory 3 and data memory 4, which address is set previously in a program change routine. Thereafter, after completion of the download, the change of the memory contents is completed through appropriate readouts (step ST6-10).

Incidentally, in the aforementioned second embodiment, one example is described in which the microcomputer 1 produces the session key data of the secret key cipher, encrypts the session key data with the public key data of the IC card having the program load function, and transmits the encrypted data to the IC card. Alternatively, the session key data may be shared in such a manner that the IC card having the program load function produces the session key data of the secret key cipher, encrypts the session key data with the public key data of the microcomputer 1, and transmits the encrypted data to the microcomputer 1.

As described above, according to the second embodiment, the program load apparatus and microcomputer 1 encrypts the data to be transmitted, shares the cipher key data for decrypting the received data, and has an encryption circuit 7a which verifies whether this is a counterpart which can transmit/receive data respectively, based on the encryption key data. When the CPU 2, as the memory contents change means, produces a decision that the encryption circuit 7a is a counterpart which can transmit/receive data with respect to the program load apparatus which determines a connection via the IC card interface section, the program load apparatus receives and decrypts the encrypted data associated with changing of the contents of the memory using the cipher key data and executes the changing of the contents of the memory, thereby improving a security function as compared to the first embodiment, as well as obtaining the same effect as the first embodiment. The aforementioned system may deal with modifications of the CPU program found to be needed after shipping, and version changes of the function of the CPU program.

Third Embodiment

Figure 8:
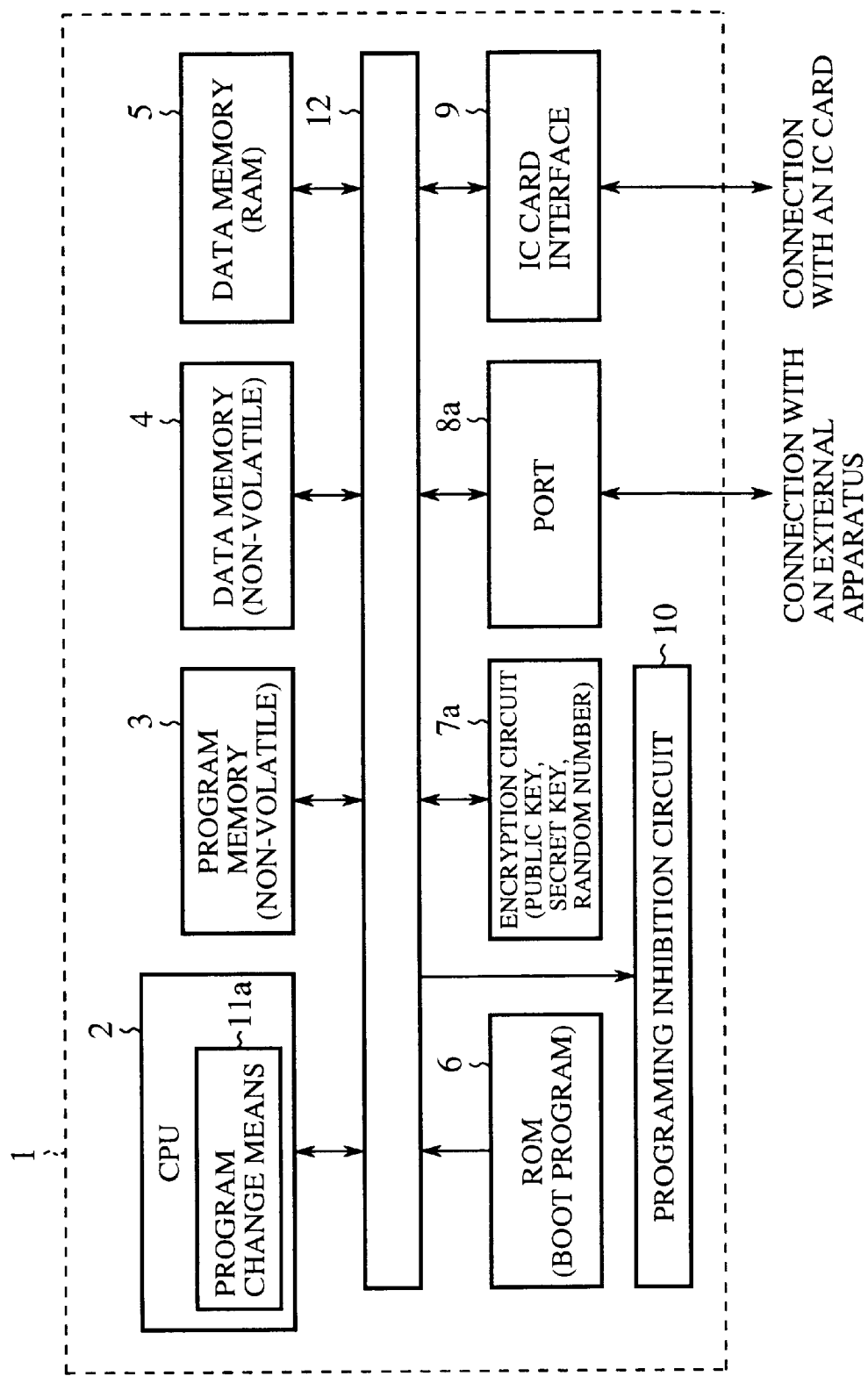
FIG. 8 is a block diagram showing a configuration of a microcomputer in accordance with a third embodiment of the present invention.

FIG. 8 is a block diagram showing a configuration of a microcomputer according to a third embodiment of the present invention. In FIG. 8, reference numeral 8a designates a port (port section) which is connected so as to be in communication with an external apparatus, and whose connection status changes from a normal connection status when the contents of a program memory 3 and a data memory 4 are changed; reference numeral 11a designates a program change means (external apparatus discrimination means, memory contents change means, port status validation means) in which a connection status of the port 8a corresponding to a time for changing the contents of the program memory 3 and data memory 4 is set previously, in addition to the operations shown in the first embodiment, and which determines whether or not the port 8a is in the connection status. The same reference numerals above are provided with the same components as those of FIGS. 1 and 5.

Figure 9:
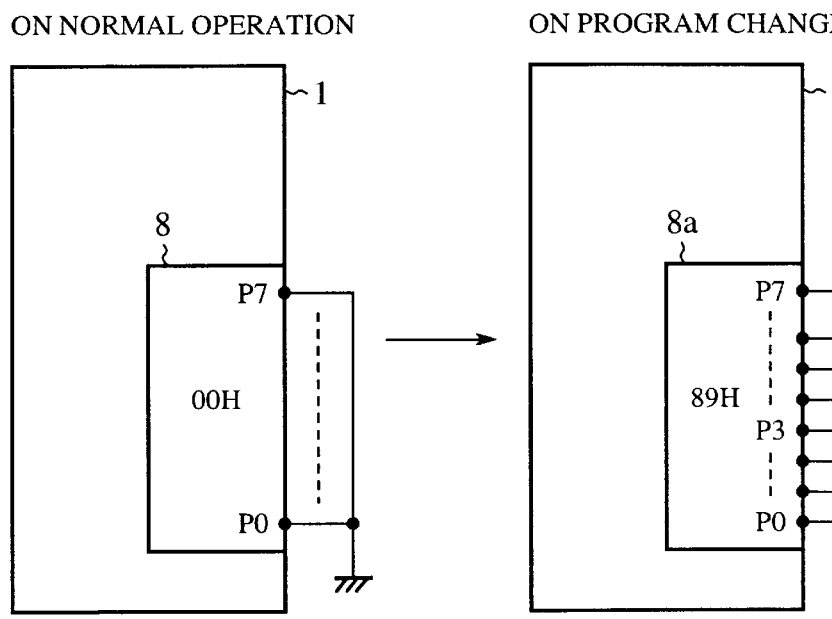
FIG. 9 illustrates a connection status at the port in the microcomputer in accordance with the third embodiment.

FIG. 9 is a view showing one example of a connection status at the port in the microcomputer according to the third embodiment 3. In FIG. 9, all ports P0–P7 constituting the port 8 are grounded during normal operation, and a setting of the port 8 is 89H; and reference numeral 27 designates a power supply applying a voltage to ports P0, P3, and P7. As the external apparatus which shares cipher key data with an encryption circuit 7a, by way of illustrative example (as not depicted, similarly with the second embodiment), an IC card is described which contains an encryption circuit capable of operating corresponding to the encryption circuit 7a. The same reference numerals above are provided with the same components as those of FIG. 1.

The operation will be described next.

Since the invention of the present application is characterized in that the CPU program of the microcomputer is designed to be changeable even after shipping, and the operation which writes the CPU program in the program memory 3 during production of the microcomputer 1 is the same as the aforementioned prior art, operations of the changing of the CPU program herein will be described.

Figure 10:
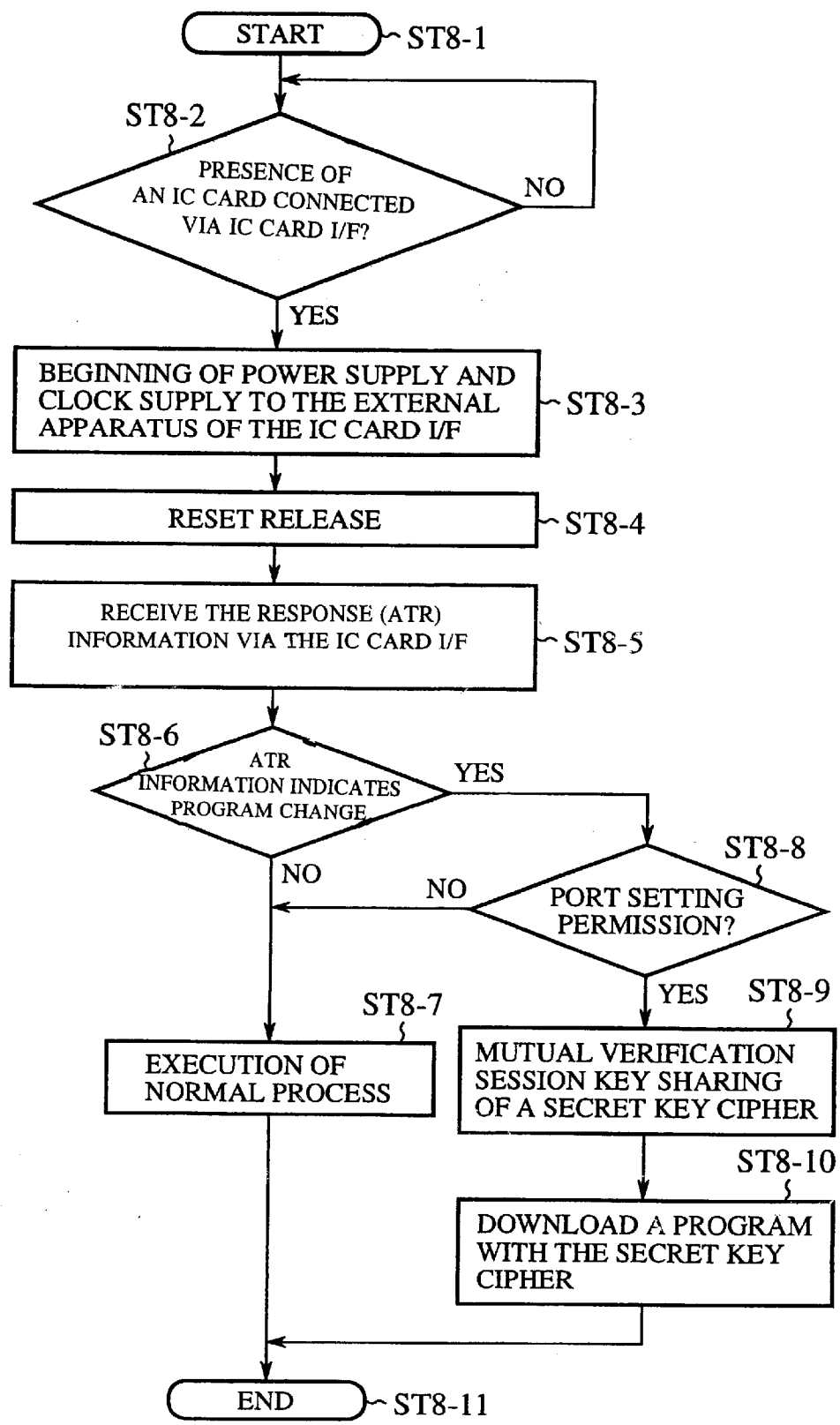
FIG. 10 is a flow chart showing memory contents change operations of the microcomputer in accordance with the third embodiment.

FIG. 10 is a flow chart showing operations of changing the contents of a memory in a microcomputer according to the third embodiment. Referring to the flow chart together with FIGS. 8 and 9, the explanation will be given as follows.

First, an IC card (not depicted) connected via the IC card interface 9 is connected with the microcomputer 1 (step ST8-1). Next, a validation operation is made as to whether or not the IC card is connected with the IC card interface 9 (step ST8-2). Then, if the IC card is connected via the IC card interface 9, processing goes to step ST8-3, while if the IC card is not connected, processing goes back to step ST8-2 to repeat the verification operation. When the connection of the IC card is validated at step ST8-2, ground potential, power supply voltage, operation clock signal, and reset signal, which are set to a L level, are supplied to the IC card (step ST8-3, initialization step). In such a way, the operation of the microcomputer contained in the IC card is initialized. Subsequently, the reset signal is set to a H level to release the reset status (step ST8-4, initialization step). The microcomputer 1 and the IC card are set to be able to communicate with each other (activation). Thereafter, the IC card returns ATR information that is a self-assigning, or self-identifying, discrimination signal to the microcomputer 1 (step ST8-5).

Assuming that the external apparatus connected via the IC card interface 9 is a normal IC card, the data in conformity with the ISO (International Standard Organization) standard is returned to the microcomputer 1 as the ATR information. When the microcomputer 1 receives the ATR information assigning, or identifying, the IC card and which is in conformity with the ISO standard, the CPU 2, functioning as the external apparatus discrimination means, reads the ATR information which has been previously set in the data memory 4 and that is associated with the discrimination signal assigning the external apparatus, and the comparison is made (step ST8-6, external apparatus discrimination step) with the ATR information received by the microcomputer 1. Then, when it is determined that this is ATR information which is in conformity with the ISO standard, the CPU 2 determines that the IC card is a normal IC card and executes a normal mode process (step ST8-7).

To recognize the IC card having a program load function for the microcomputer 1, ATR information that is not in conformity with the ISO standard is set previously in the IC card. In such a way, when the microcomputer 1 receives the ATR information in response to the reset release, the CPU 2 determines that the external apparatus connected via the IC card interface 9 is an IC card having a program load function.

So far, the operation is the same as the second embodiment.

In step ST8-6, when the microcomputer 1 recognizes the IC card connected via the IC card interface 9 as having the program load function, the program change means 11a performs an operation that detects a setting of the port 8a in accordance with a program change routine. Specifically, the program change means 11a checks each potential of the ports P0–P7 constituting the port 8a, thereby making a decision whether the ports P0–P7 are in a status corresponding to the time when changing the contents of the program memory 3 and data memory 4 set previously is to occur. As shown in FIG. 9, when a setting of the port 8a, designated by 89H, is provided which corresponds to the time for changing the contents of the program memory 3 and data memory 4, such that in times of normal operation the potential of all the ports P0–P7 is not at a ground level or a L level, but the ports P0, P3, and P7 are at a H level, the program change means 11a makes a decision in which the contents of the program memory 3 and data memory 4 are to be changed (step ST8-8). Here, the setting of the port 8a corresponding to the time for changing the contents of the program memory 3 and data memory 4, may be set in the program memory 3 or the data memory 4 as a program change routine so that the CPU 2 can read out the routine appropriately.

At step ST8-8, when the potential of all the ports P0–P7 is ground potential, which is a port setting indicating normal operation time, the step goes to step ST8-7 and executes a process for a normal IC card. That is, though recognizing an IC card having a program load function, the microcomputer 1 changes to a status that will not accept data associated with changing the contents of the program memory 3 and data memory 4. When a setting of the port 8a corresponding to a time for changing the contents of the program memory 3 and data memory 4 is detected, processing goes to the step ST8-9 and performs a mutual verification operation. The following operations from step ST8-9 to step ST8-11 are the same as those of step ST6-8 to step ST6-10 in the embodiment 2.

As described above, when the connection status of the port 8a is added to conditions for changing the contents of the program memory 3 and data memory 4 of the microcomputer 1 after shipping, a port-prepared board must be modified physically to change its connection status. If the setting of the port 8a corresponding to changing of the contents of the program memory 3 and data memory 4 is unknown, the contents of the program memory 3 and data memory 4 cannot be changed, thereby achieving a further improved security as compared to the second embodiment.

A function improving the security in accordance with the invention will be described below.

Figure 11:
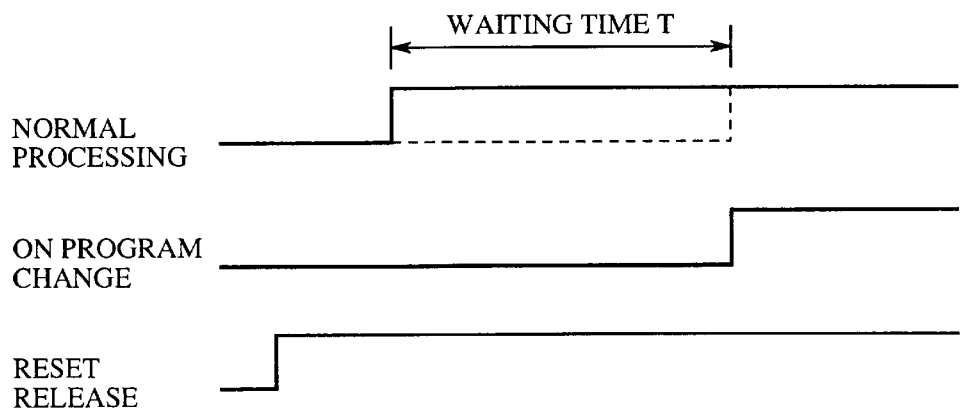
FIG. 11 is a timing chart showing process timings with respect to an external apparatus connected via the IC card interface section in the microcomputer in accordance with the third embodiment.

FIG. 11 is a timing chart showing process timings with respect to an external apparatus connected via the interface section in the microcomputer according to the third embodiment.

In FIG. 11, the horizontal axis denotes the passage of time starting from the validation operation for determining whether or not the external apparatus is connected with the microcomputer via the IC card interface 9, and the vertical axis denotes the level of data exchanged between the microcomputer 1 and the external apparatus. An IC card is connected having the program load function via the IC card interface 9, as mentioned above.

As shown in FIG. 11, when data of a H level is input to a reset terminal of the IC card having the program load function to release the reset status, the IC card transmits data associated with changing the contents of the program memory 3 and data memory 4, to the microcomputer 1, operating similarly to the aforementioned embodiments. In such a way, data of a H level and a L level is inputted to the microcomputer 1 via the input/output terminal I/O of the IC card interface 9 designated by "on program change". Then, as compared to the case in which the normal IC card inputs/outputs to the microcomputer 1 designated by "normal processing" via the input/output terminal I/O of the IC card interface 9, since the microcomputer 1 according to the third embodiment performs the operations of step ST8-6 to step ST8-10, a time delay occurs designated by a dotted line during a period of time, i.e., waiting time T, in which data associated with changing the contents of the memory of, at first, a H level is inputted to the microcomputer 1.

Thus, when the microcomputer 1 is connected with the external apparatus via the IC card interface and data transmission/reception between the external apparatus and the microcomputer 1 is delayed, it is determined that an external apparatus which is the program load apparatus is connected with the microcomputer 1.

In the microcomputer of the third embodiment, even in normal processing, a timing of the start of the process which executes an order of the CPU program is set to be delayed by only the waiting time T as shown in FIG. 11, which matches a timing between program change operation and normal processing. In such a way, it may not be determined that the program load apparatus is connected with the microcomputer 1 based on the timing of the start of the process when the CPU 2 functions as delay control means as described above.

On the other hand, the program change routine has a function that measures a period of time in which data is transmitted from the program load apparatus to the microcomputer 1, and based on the measurement results, the timing of start of the process is set, thus determining the aforementioned waiting time T.

As described above, according to the third embodiment, the microcomputer 1 is comprised of the port 8a which is connected so as to be in communication with the external apparatus, and of which the status is set previously, and the CPU 2, having the program change means, whether or not the port 8a is put in the previously set status. When the CPU 2, which is also the memory contents changing means, determines whether the port 8a is put in the connection status corresponding to a time for changing the contents of the program memory 3 and data memory 4, it receives data associated with changing of the contents of the program memory 3 and data memory 4 from the program load apparatus and executes that change in contents. In such a way, the same effect as the second embodiment may be obtained; in addition, it is required to change the connection status by modifying the physically port prepared board, and if the port 8a setting is unknown, which corresponds to the time for changing the contents of the program memory 3 and data memory 4, the contents of the program memory 3 and data memory 4 are not changeable, thereby improving the security.

In addition, according to the third embodiment, since the CPU 2, which is the memory contents change means, has a function as a delay control means which delays the timing of operation start of the IC card connected via the IC card interface 9 by the amount of time required for changing the contents of the program memory 3 and data memory 4, the timings of data transmission/reception match each other in normal process time and in program change time, which can not thereby indicate a difference between these processes, thus improving the security.

In the third embodiment, after the contents of the program memory 3 and data memory 4 are changed, the cipher key data such as the public key data and the secret key data may be reprogrammed to be applicable to only the mutual verification between the program load apparatus and the microcomputer 1.

Specifically, there is a difference in security level with respect to the contents of the program memory 3 and data memory 4, depending on the purpose of the microcomputer 1. For this reason, when a reprogramming function to the microcomputer 1 of high security level is provided in the program change routine, a malicious user cannot change the contents of the program memory 3 and data memory 4, thereby improving the security level. The reprogramming function is reprograms the cipher key data before issuing such as the public key data and secret key data that was used for changing the contents of the program memory 3 and data memory 4 so as to be applicable to only the mutual verification between the program load apparatus and the microcomputer 1.

On the other hand, with respect to the microcomputer 1 of a low security level, cipher key data such as public key data and secret key data which was used for changing the contents of the program memory 3 and data memory 4 is provided as an operation key data to be used practically in one system, thus revising the version of the CPU program in a field, though there is some danger that a malicious user may change the contents of the program memory 3 and data memory 4. In such a way, since a level may be provided for the security to changing the contents of the program memory 3 and data memory 4, operations to change the memory contents corresponding to a purpose of the microcomputer 1 may be carried out.

Fourth Embodiment

In the first three embodiments, when it is determined that the program load apparatus is connected via the IC card interface 9, the program change means 11, 11a carry out the operations to change the memory contents in accordance with the program change routine stored in the program memory 3. On the other hand, in a microcomputer according to a fourth embodiment, changing of the memory contents is carried out by use of the boot program that was used during production of the microcomputer 1. The configuration of the microcomputer 1 according to the fourth embodiment is the same as that shown in FIG. 1 in main parts.

The summary will be described next.

As in the first three embodiments, when the program change means 11, 11a recognize the program load apparatus connected via the IC card interface 9, the program change means 11, 11a release an inhibition operation of the programming inhibition circuit 10 which inhibits the use of the boot program.

Specifically, the boot program is put in use prohibition status when the programming inhibition circuit 10 reloads status information relating to the use of the boot program in the program memory 3 to which the CPU 2 refers, upon execution of the order in the CPU program to change the status information to that denoting "use inhibition". Then, when the program load apparatus connected via the IC card interface 9 is recognized, the program change means 11, 11a are provided with a function of changing the status information denoting "use inhibition" of the boot program to status information denoting "use permission", and the contents of the program memory 3 and data memory 4 are changed in accordance with the boot program as is done during the production of the microcomputer 1.

As described above, according to the fourth embodiment, there is provided a ROM 6 storing the boot program that may execute a change of data, including the CPU program, stored in the program memory 3 and data stored in data memory 4, and the program inhibition circuit 10 that inhibits the use of the boot program. When the program change means 11 determines that the program load apparatus is connected via the IC card interface 9 based on ATR information, the use inhibition of the boot program by the programming inhibition circuit 10 is released to allow execution of the changing of the contents of the program memory 3 and data memory 4 based on the boot program. Accordingly, it is not required to create a specific program routine in the program memory 3 to be stored, thereby obtaining the effect of the first three embodiments by use of the existing architecture of the microcomputer 1. Therefore, the microcomputer of the present invention may be reduced in cost.

Fifth Embodiment

Figure 12:
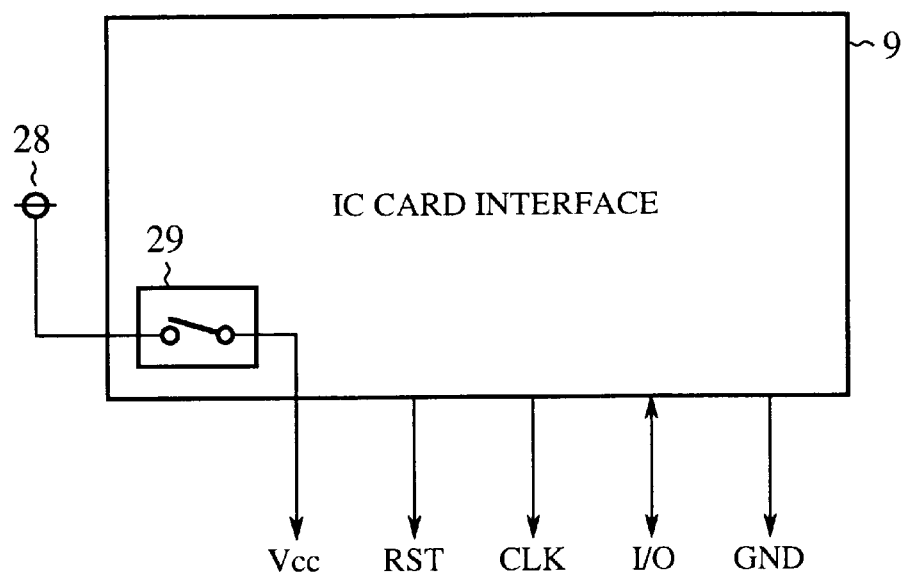
FIG. 12 is a schematic view showing an IC card interface section of a microcomputer in accordance with a fifth embodiment of the present invention.

FIG. 12 is a schematic view showing an IC card interface section of a microcomputer according to a fifth embodiment 5 of the present invention. In FIG. 12, reference numeral 28 designates a power supply (power supply means) which is fed from the microcomputer 1; and reference numeral 29 designates switch means (power supply feed means) which controls the power supply voltage which is fed from the power supply 28 to the IC card connected via the IC card interface section 9.

Figure 13:
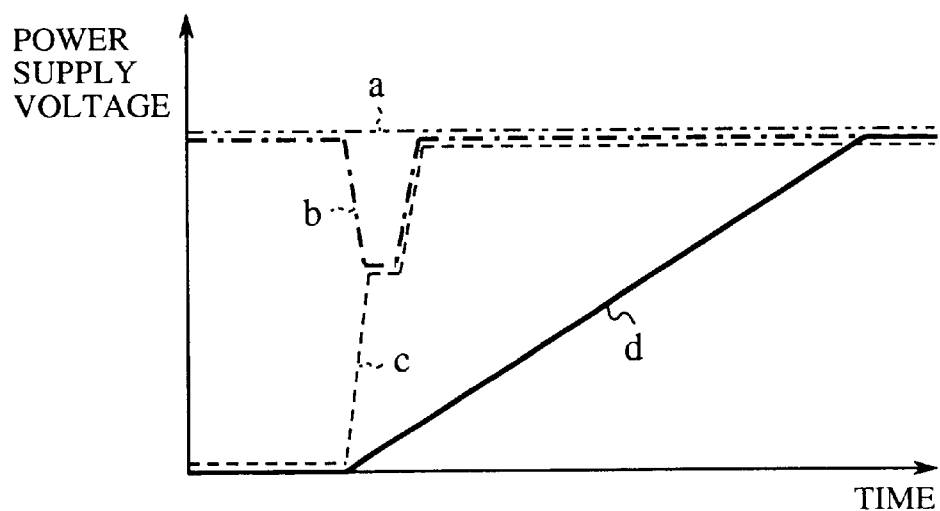
FIG. 13 is a graph showing the relationship between respective power supply voltages of an IC card, a conventional microcomputer, and the microcomputer in accordance with the fifth embodiment and passage of time from the beginning of feeding a power supply voltage to the IC card in the IC card interface section of FIG. 12.

FIG. 13 is a graph showing the relationship between respective power supply voltages of the IC card, a conventional microcomputer, and the microcomputer according to the fifth embodiment and passage of time from the beginning of feeding a power supply voltage to the IC card in the IC card interface section of FIG. 12. In FIG. 13, a first dotted line denoted by symbol "a" designates power supply voltage value of the microcomputer 1; a second dotted line denoted by symbol "b" designates power supply voltage value of the microcomputer 100; a third dotted line denoted by symbol "c" designates power supply voltage value of the IC card connected with the microcomputer 100; and a fourth solid line denoted by symbol "d" designates power supply voltage value of the IC card connected with the microcomputer 1.

The summary will be described next.

Since the conventional microcomputer 100 does not feed power supply to the IC card taking into consideration its own power supply voltage, the power supply voltage drops in accordance with the increase of the power supply voltage to the IC card upon feeding the power supply voltage to the IC card (see dotted lines b, c). The drop of the power supply voltage of the microcomputer 100 may cause operation failures to hinder normal operations of the security function.

For this reason, in the fifth embodiment, a switch means 29 is provided in the IC card interface 9 which is controlled by the CPU 2, and the CPU program stored in the program memory 3 is set, so as to prevent the power supply voltage of the microcomputer 1 from dropping, for example, by increasing the voltage supplied to the power supply voltage level of the IC card in stages around several hundreds mV/sec (see lines a, d). In this manner, a microcomputer may be provided that has no occurrences of voltage drop upon feeding the power supply to the IC card.

As described above, according to the fifth embodiment, since power supply feed means is provided which feeds the power in stages up to a power value which enables the external apparatus including the IC card to operate, there is no occurrences of the voltage drop on feeding of the power supply to the power supply apparatus IC card, thereby reducing instability of operations, and further improving the security function in the operations of changing the memory contents of the microcomputer.

In addition, the following constitution may be applied.

Figure 14A:
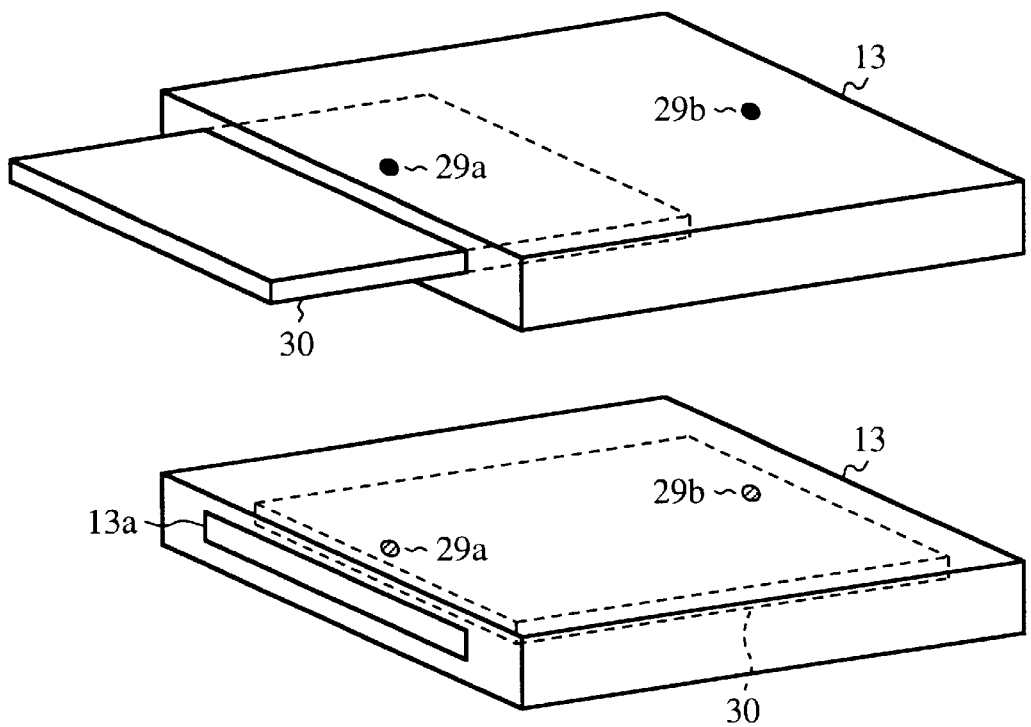
FIGS. 14A and 14B are schematics of an IC card information processor employing the microcomputer in accordance with the first embodiment of the present invention.
Figure 14B:
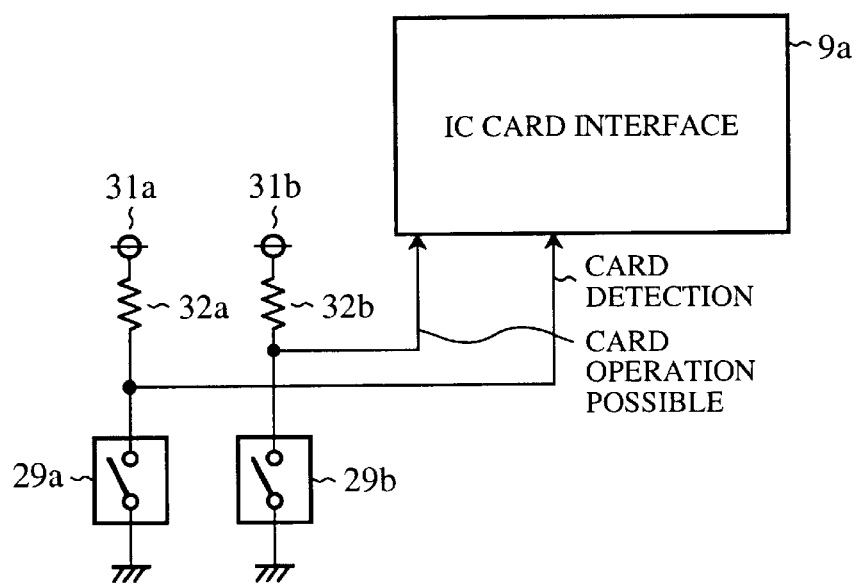
Figure 15:
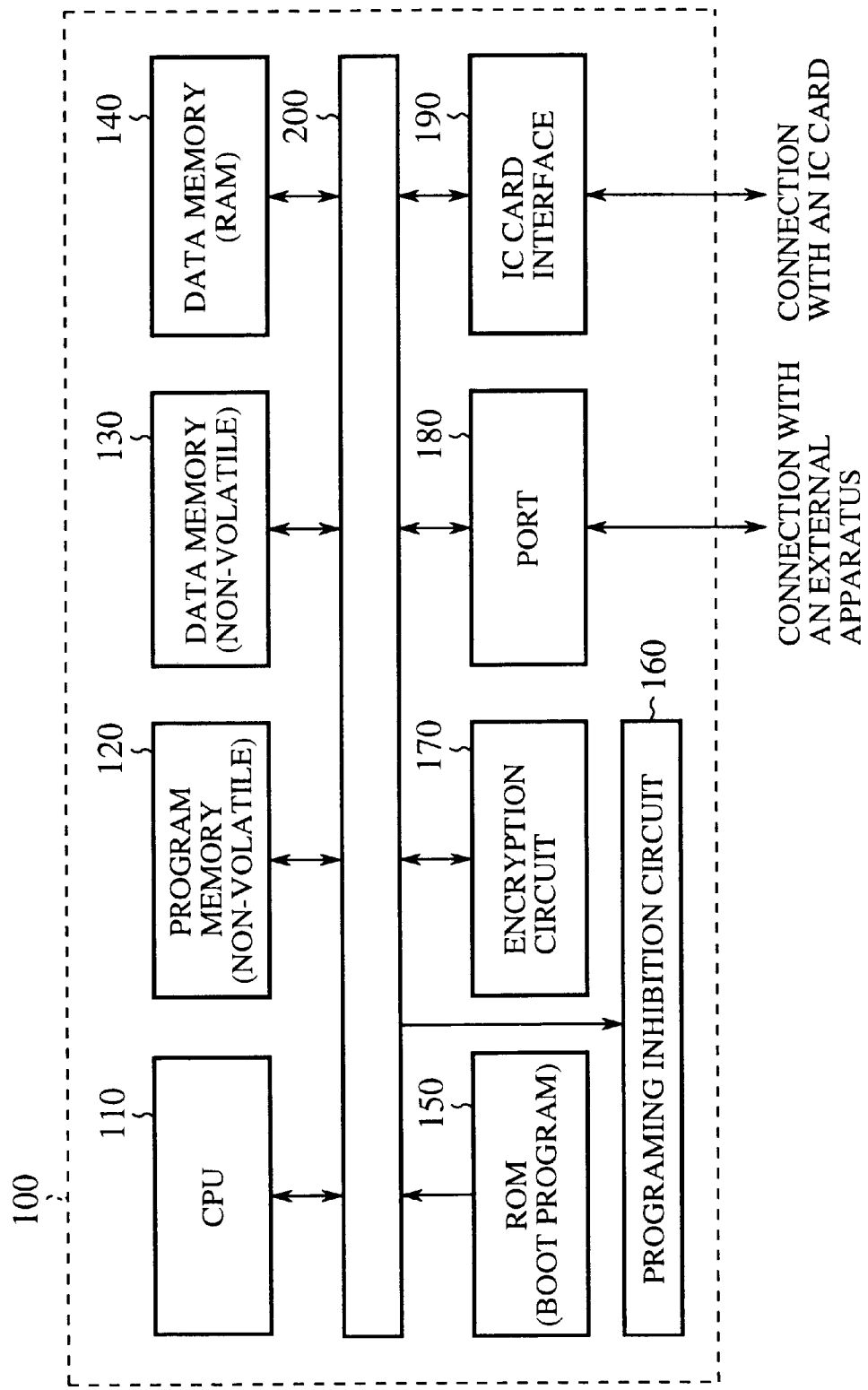
FIG. 15 is a block diagram showing a configuration of a conventional microcomputer.
Figure 16:
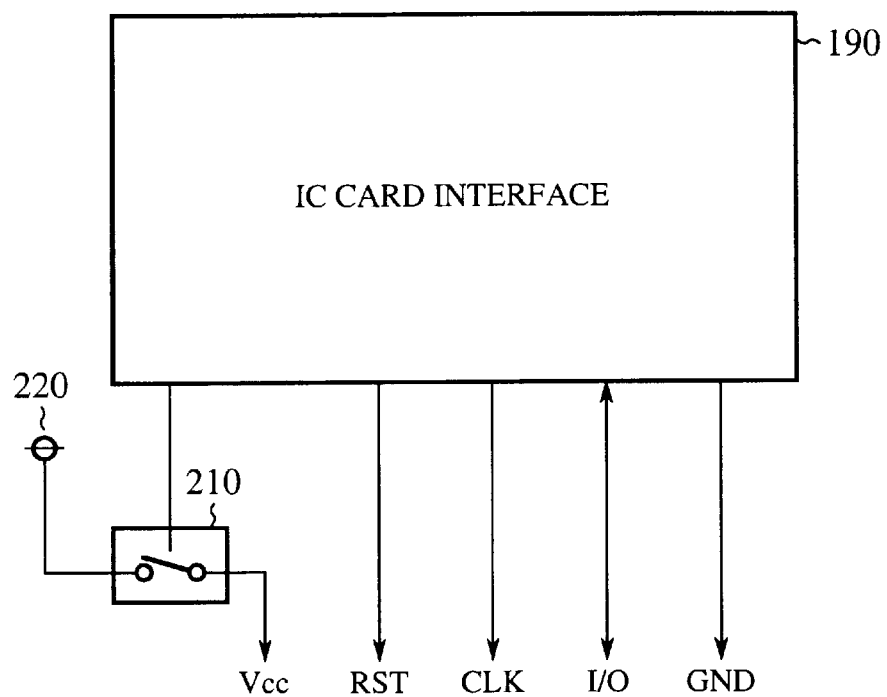
FIG. 16 is a block diagram showing an IC card interface of the conventional microcomputer.
Figure 17:
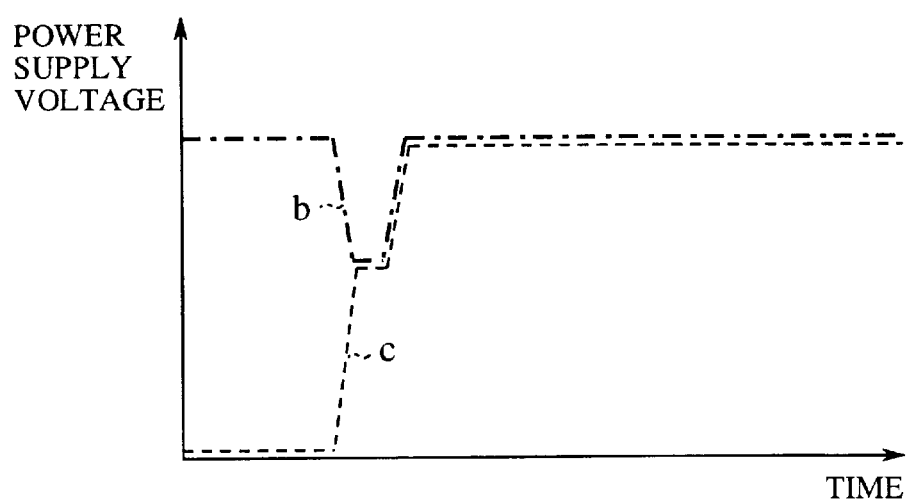
FIG. 17 is a graph showing relationships between respective power supply voltages of the IC card and the conventional microcomputer and time of passage from the beginning of feeding the power supply voltage to the IC card at the IC card interface section in FIG. 16.

FIG. 14A is a view showing an operation on insertion of an IC card to an IC card information processor; and FIG. 14B is a view showing a constitution of an IC card interface section. In FIGS. 14A and 14B, reference numeral 9a designate an IC interface (IC interface section) having two input switches 29a, 29b; reference numeral 13 designates an IC card information processor incorporating the microcomputer 1, comprising an IC card read/writer and similar circuits.

Reference numeral 13a designates an IC card insertion opening; and 29a designates an input switch provided around the IC card insertion-opening 13, outputting a signal denoting the presence or absence of the IC card to the IC card interface 9a.

Reference numeral 29b designates an input switch provided in a deep position within the IC card insertion opening 13a of the IC card information processor 13, outputting an signal denoting whether or not the IC card is inserted perfectly within the IC card information processor 13 to perform an operation; reference numeral 30 designates an IC card which is inserted in the IC card information processor 13; reference numerals 31a, 31b designate power supplies constituting the input switches 29a, 29b, respectively; and reference numerals 32a, 32b designate pull-up resistors of the input switches 29a, 29b, respectively.

The operation will be described next.

As shown in FIG. 14B, before the IC card is inserted into the IC card information processor 13, the input switches 29a, 29b are in an open state, and signals of a H level are inputted through the power supplies 31a, 31b and pull-up resistors 32a, 32b to the IC card interface 9a. Here, when the IC card 30 is inserted into the IC card information processor 13, and the IC card 30 comes in contact with the input switch 29a configured around the IC card insertion opening 13a, the input switch 29a is in a closed state. In such a way, the power supply 31a and the pull-up resistor 32a are grounded, a signal of a L level is input to the IC card interface 9a, and the microcomputer may validate the full insertion of the IC card.

Further, when the IC card 30 is inserted into the IC card information processor 13, and the IC card comes in contact with the input switch 29b located in a deep position from the IC card insertion opening 13a, the input switch 29b is in closed state. In such a way, the power supply 31b and the pull-up resistor 32b are grounded and a signal of a L level is inputted to the IC card interface 9a, so that the microcomputer may validate that the IC card is inserted perfectly in the IC card information processor 13d so as to be operable.

The applications of such a constitution as described in the exemplary embodiments may carry out accurately a validation operation, i.e., whether the external apparatus is connected with the IC card interface 9a or not.

What is claimed is:

1. A microcomputer comprising:
   a memory for storing data, including a CPU program to be executed by a CPU;
   an IC card interface section adapted to be connected with an external apparatus comprising an IC card;
   a discrimination information storing unit which is set in advance with information associated with a discrimination signal which may identify said external apparatus connected via said IC card interface section;

external apparatus discrimination means for discriminating said external apparatus when it is connected to said IC card interface section by comparing the discrimination signal with the information associated with the discrimination signal which is set in said information storing unit, when feedings of a power supply and a clock signal and initializing of an operation are carried out to the external apparatus which is connected via said IC card interface section to be set in a communicatable status; and memory contents change means for executing the changing contents of said memory by receiving new data from said external apparatus when said external apparatus discrimination means discriminates, based on said discrimination signal, that an external apparatus which is adapted to send data associated with the changing of the contents of said memory is connected via said IC card interface section.

2. The microcomputer according to claim 1, further comprising:

a port section connected so as to be in communication with an external apparatus; and port status validation means for discriminating whether or not said port section is in a connection status corresponding to a time for changing the contents of said memory, and wherein said memory contents change means receives said data from said external apparatus which transmits the data associated with the changing of the contents of said memory and executes the changing of the contents of said memory, when said port status validation means discriminates that said port section is in a connection status corresponding to the time for changing the contents of said memory.

3. The microcomputer according to claim 1, further comprising delay control means for delaying starting of an operation by the IC card connected via said IC card interface section, by a period of time in which said memory contents change means requires to change the contents of said memory.

4. The microcomputer according to claim 1, further comprising:

a reload program storing unit for storing a reload program which may execute a change of the data containing the CPU program stored in said memory; and programming inhibition means for inhibiting use of said reload program, and wherein said memory contents change means releases use inhibition of said reload program set by said programming inhibition means and executes the changing of the contents of said memory based on said reload program, when said external apparatus discrimination means discriminates, based on said discrimination signal, that an external apparatus which may transmit the data associated with the changing of the contents of said memory is connected to said microcomputer via said IC card interface section.

5. The microcomputer according to claim 1, further comprising power supply feed means for feeding power in stages up to a power value in which the external apparatus including the IC card and connected via said IC card interface section starts to be operable.

6. A system for changing memory contents of a microcomputer comprising:

a memory for storing data containing a CPU program executed by a CPU; and an IC card interface section connected so as to be in communication with an external apparatus including an IC card, further including connection means for connecting said microcomputer with said IC card interface section, and a program load apparatus for creating data associated with a changing of the contents of said memory to transmit the created data to said microcomputer, wherein said microcomputer includes:

a discrimination information storing unit which is set in advance with information associated with a discrimination signal which may identify said external apparatus connected via said IC card interface section;

external apparatus discrimination means for discriminating said external apparatus when it is connected to said IC card interface section by comparing the discrimination signal with the information associated with the discrimination signal which is set in said information storing unit, when feedings of a power supply and a clock signal and initializing of an operation are carried out to the external apparatus which is connected via said IC card interface section to be set in a communicatable status; and memory contents change means for executing the changing of the contents said memory by receiving the data associated with the changing of the contents said memory from said program load apparatus, when said external apparatus discrimination means discriminates that said program load apparatus is connected via said IC card interface section based on said discrimination signal.

7. The system for changing the memory contents of a microcomputer according to claim 6, wherein said microcomputer includes:

a port section connected so as to be in communication with said external apparatus; and port status validation means for discriminating whether or not said port section is in a connection status corresponding to a time for changing the contents of said memory is previously set, and wherein said memory contents change means receives said data from said external apparatus which transmits the data associated with the changing of the contents of said memory and executes the changing of the contents of said memory, when said port status validation means discriminates that said port section is in the connection status corresponding to the time for changing contents of said memory.

8. The system for changing the memory contents of a microcomputer according to claim 6, wherein said program load apparatus and said microcomputer each includes verification means for encrypting data to be transmitted, sharing cipher key data which may decrypt received data, and verifying a counterpart to transmit/receive data with one another based on said cipher key data, and wherein said memory contents change means receives and decrypts the data which is associated with the changing of the contents of said memory and wherein said program load apparatus encrypts with said cipher key data, and executes the changing of the contents of said memory, when said verification means verifies that said program load apparatus which said external apparatus discrimination means determines is connected to said microcomputer via said IC card interface section is a counterpart with which data can be transmitted/received.

9. The system for changing the memory contents of a microcomputer according to claim 8, wherein said memory contents change means reloads so as to be applicable to only a mutual verification between said program load apparatus and said microcomputer after changing the contents of said memory.

10. The system for changing the memory contents of a microcomputer according to claim 6, wherein said microcomputer includes delay control means for delaying starting of an operation by the IC card connected via said IC card interface section, by a period of time in which said memory contents change means requires to change the contents of said memory.

11. The system for changing the memory contents of a microcomputer according to claim 6,
wherein said microcomputer includes:
   a reload program storing unit for storing a reload program which may execute a change of the data containing the CPU program stored in said memory; and
   programming inhibition means for inhibiting use of said reload program, and
wherein said memory contents change means releases use inhibition of said reload program set by said programming inhibition means and executes the changing of the contents of said memory based on said reload program, when said external apparatus discrimination means discriminates, based on said discrimination signal, that an external apparatus which may transmit the data associated with the changing of the contents of said memory is connected to said microcomputer via said IC card interface section.

12. A method of changing memory contents a microcomputer which includes: a memory for storing data containing a CPU program executed by a CPU; and an IC card interface section connected so as to be in communication with an external apparatus including an IC card, said method comprising:
   an initialization step of setting status of said external apparatus to be in communication with said microcomputer by feedings of a power supply and a clock signal and initializing of an operation to the external apparatus which is connected via said IC card interface section so as to be in a communicatable status;
   an external apparatus discrimination step of discriminating whether said external apparatus is connected to said microcomputer based on a discrimination signal to be transmitted from said external apparatus after said initialization step; and
   a step of changing the contents of the memory, when a program load apparatus, which may transmit data associated with the changing of the contents of said memory, is discriminated to be connected via said IC card interface section at said external apparatus discrimination step, receiving said data from said program load apparatus and executing the changing of the contents of said memory.

* * * * *